United States Patent
Murtha

(10) Patent No.: US 7,866,931 B2
(45) Date of Patent: Jan. 11, 2011

(54) PRESET DEPTH ADAPTER AND FINGER GUARD FOR SCREWS AND NAILS WHEN INSTALLING SHEETROCK

(76) Inventor: James Murtha, 67 Garfield Ave., Sayville, NY (US) 11782

( * ) Notice: Subject to any disclaimer, the term of this patent is extended or adjusted under 35 U.S.C. 154(b) by 328 days.

(21) Appl. No.: 11/653,030

(22) Filed: Jan. 12, 2007

(65) Prior Publication Data

US 2007/0122253 A1    May 31, 2007

Related U.S. Application Data

(63) Continuation-in-part of application No. PCT/US2005/024805, filed on Jul. 13, 2005.

(51) Int. Cl.
*F16B 43/02* (2006.01)
(52) U.S. Cl. .................... 411/546; 411/531
(58) Field of Classification Search ......... 411/546–548, 411/396, 148, 158, 160, 161, 531; D8/399
See application file for complete search history.

(56) References Cited

U.S. PATENT DOCUMENTS

| | | | |
|---|---|---|---|
| 97,866 | A | 12/1869 | Bourne |
| 121,305 | A | 11/1871 | Worthen |
| 156,699 | A | 11/1874 | Fuller |
| 465,101 | A | 12/1891 | Richards |
| 466,463 | A | 1/1892 | Holland |
| D26,563 | S | 1/1897 | Heiser |
| 746,006 | A | 12/1903 | Brigham |
| 765,139 | A | 7/1904 | Hirsch |
| 933,865 | A | 9/1909 | Umholtz |
| 937,199 | A | 10/1909 | Willard |
| 970,423 | A | 9/1910 | Cunningham |

(Continued)

FOREIGN PATENT DOCUMENTS

GB         737968         10/1955

(Continued)

OTHER PUBLICATIONS

International Search Report dated Oct. 31, 2005, from corresponding International Application No. PCT/US05/24805, now International Publication WO 2006/019786.

*Primary Examiner*—Gary Estremsky
(74) *Attorney, Agent, or Firm*—Katten Muchin Rosenman LLP

(57) ABSTRACT

An apparatus for a present depth adapter (10) having a flared body that is narrow at the bottom (68) with a wider top portion (46) and a central recess or throughbore (50) extending therethrough. The present invention (10) comes in a variety of sizes wherein the depth from top to bottom is slightly less than the thickness of common sheetrock (18) used in the industry. The shaft of the screw or nail is inserted through the top of the recess (50) until the head rests thereagainst. The screw or nail is installed and cannot be driven any further once the bottom (68) of the preset depth adapter makes contact with the stud (16) regardless of whether the stud is wood or steel. This results in each screw or nail being countersunk to the proper depth and prevents the hardware from being driven too far into the sheetrock (18) and compromising the fastening integrity thereof. The flared shape of the present invention (10) forms a plug that assures an absolute bond to the sheetrock (18).

3 Claims, 24 Drawing Sheets

U.S. PATENT DOCUMENTS

| | | |
|---|---|---|
| 1,031,368 A | 7/1912 | Perry |
| 1,108,209 A | 8/1914 | Mitchell et al. |
| 1,127,090 A | 2/1915 | Reedy |
| 1,251,676 A | 1/1918 | McCaffray |
| 1,301,302 A | 4/1919 | Nolan |
| 1,410,459 A | 3/1922 | Chenel |
| 1,487,610 A | 3/1924 | Schatzel |
| 1,497,859 A | 6/1924 | Lilly |
| 1,603,895 A | 10/1926 | Berger |
| 1,637,419 A | 8/1927 | Klein |
| 1,763,264 A | 6/1930 | Shanks |
| RE19,116 E * | 3/1934 | Olson .................. 411/161 |
| 2,006,525 A | 7/1935 | Thal |
| 2,048,234 A | 7/1936 | Tucker |
| 2,060,970 A | 11/1936 | Belden |
| 2,092,682 A | 9/1937 | Roske |
| 2,111,110 A | 3/1938 | Deniston, Jr. et al. |
| 2,171,877 A | 9/1939 | Johnson |
| 2,172,553 A | 9/1939 | Tripp |
| 2,244,226 A | 6/1941 | Wales, Jr. |
| 2,404,928 A | 7/1946 | Schutten |
| 2,561,679 A | 7/1951 | Waller |
| 2,684,515 A | 7/1954 | Zahodiakin |
| 2,746,506 A * | 5/1956 | Poupitch ............... 411/134 |
| 2,761,348 A | 9/1956 | Williams et al. |
| 2,764,053 A | 9/1956 | Lovisek |
| 2,829,502 A | 4/1958 | Dempsey |
| 2,834,998 A * | 5/1958 | Wilder ................... 52/208 |
| 3,077,218 A * | 2/1963 | Ziegler ................. 411/155 |
| 3,137,195 A | 6/1964 | Rosenberg, Jr. |
| 3,177,755 A | 4/1965 | Kahn |
| 3,178,984 A | 4/1965 | Barothy |
| 3,191,864 A | 6/1965 | Moses |
| 3,283,639 A | 11/1966 | Holton |
| 3,298,270 A * | 1/1967 | Pierre .................. 411/542 |
| 3,301,122 A | 1/1967 | Wagner |
| 3,320,845 A | 5/1967 | Eschweiler |
| 3,389,736 A | 6/1968 | Gulistan |
| 3,455,199 A | 7/1969 | Semanchik |
| 3,531,850 A | 10/1970 | Durand |
| 3,596,656 A * | 8/1971 | Kaute .................... 606/65 |
| 3,620,119 A | 11/1971 | King, Jr. et al. |
| 3,855,750 A | 12/1974 | Reiland |
| 3,858,478 A | 1/1975 | Boudreau, Jr. |
| 3,894,467 A | 7/1975 | Brescia |
| 3,977,146 A | 8/1976 | Wiley |
| 3,978,759 A | 9/1976 | Bakoledis |
| 4,010,519 A | 3/1977 | Worthing |
| 4,010,671 A | 3/1977 | Hubbard et al. |
| 4,029,426 A | 6/1977 | Sims, Jr. |
| 4,112,693 A | 9/1978 | Collin et al. |
| 4,232,496 A | 11/1980 | Warkentin |
| 4,286,496 A | 9/1981 | Harris |
| 4,361,997 A | 12/1982 | DeCaro |
| 4,380,413 A | 4/1983 | Dewey |
| 4,445,808 A | 5/1984 | Arya |
| 4,545,270 A | 10/1985 | Dewey |
| 4,610,589 A | 9/1986 | Bredal |
| 4,618,290 A | 10/1986 | Hansen |
| 4,630,984 A | 12/1986 | Reinwall et al. |
| 4,653,244 A | 3/1987 | Farrell |
| 4,663,910 A | 5/1987 | Hasan |
| 4,707,880 A | 11/1987 | Doyle et al. |
| 4,712,959 A | 12/1987 | Hasan |
| 4,757,661 A | 7/1988 | Hasan |
| 4,781,503 A | 11/1988 | Bogel |
| 4,781,508 A | 11/1988 | Schroeder et al. |
| 4,793,757 A | 12/1988 | Peterson |
| 4,884,932 A | 12/1989 | Meyer |
| 4,898,398 A | 2/1990 | Cassel |
| 4,932,819 A | 6/1990 | Almeras |
| 4,948,312 A | 8/1990 | Jochum |
| 4,957,403 A | 9/1990 | Corain et al. |
| 4,959,938 A * | 10/1990 | De Caro ................... 52/410 |
| 4,979,858 A | 12/1990 | Van Allman et al. |
| 5,011,354 A | 4/1991 | Brownlee |
| 5,037,259 A | 8/1991 | Duran et al. |
| 5,056,870 A | 10/1991 | Plumer |
| 5,082,412 A | 1/1992 | Thomas |
| 5,118,235 A | 6/1992 | Dill |
| 5,122,022 A | 6/1992 | Kluser |
| 5,171,118 A | 12/1992 | Rothenbuhler |
| 5,217,339 A | 6/1993 | O'Connor et al. |
| 5,255,485 A | 10/1993 | Lemke et al. |
| 5,259,759 A * | 11/1993 | Jorneus et al. ............ 433/173 |
| 5,266,245 A * | 11/1993 | Wellings ................... 264/35 |
| 5,511,918 A | 4/1996 | Rotter |
| 5,517,883 A | 5/1996 | Goldi et al. |
| 5,518,352 A | 5/1996 | Lieggi |
| 5,528,872 A | 6/1996 | Rotter |
| 5,542,753 A * | 8/1996 | Plumer ..................... 301/65 |
| 5,607,272 A | 3/1997 | Olvera et al. |
| 5,624,220 A | 4/1997 | Janssen et al. |
| 5,626,451 A | 5/1997 | Seibert |
| 5,664,922 A | 9/1997 | Janssen et al. |
| 5,676,511 A | 10/1997 | Meylan |
| 5,772,381 A * | 6/1998 | Olvera et al. ............. 411/533 |
| 5,779,421 A | 7/1998 | Beck et al. |
| 5,813,185 A * | 9/1998 | Jackson .................... 52/562 |
| 5,829,933 A * | 11/1998 | Kramer .................... 411/156 |
| 5,890,860 A | 4/1999 | Dorris |
| 5,915,903 A | 6/1999 | Osterle et al. |
| 6,062,789 A | 5/2000 | Pope |
| 6,106,077 A | 8/2000 | Kluge et al. |
| 6,109,232 A | 8/2000 | Bomar |
| 6,116,834 A | 9/2000 | Dorris |
| 6,220,801 B1 | 4/2001 | Lin |
| 6,241,446 B1 | 6/2001 | Herzog |
| 6,309,157 B1 | 10/2001 | Amann et al. |
| 6,357,981 B1 * | 3/2002 | Lanham et al. ............ 411/431 |
| 6,363,679 B1 | 4/2002 | Rutherford |
| 6,406,243 B1 * | 6/2002 | Kolodziej et al. .......... 411/533 |
| 6,425,720 B1 | 7/2002 | Kramer |
| 6,514,005 B2 * | 2/2003 | Shiokawa et al. ........ 403/408.1 |
| 6,558,098 B1 | 5/2003 | Angehrn et al. |
| D480,953 S | 10/2003 | Lee et al. |
| 6,659,702 B2 | 12/2003 | Kitayama et al. |
| 6,663,330 B2 | 12/2003 | Powell |
| 6,676,353 B1 | 1/2004 | Haytayan |
| 2002/0106260 A1 | 8/2002 | Schenk |
| 2002/0131842 A1 * | 9/2002 | Eriksson .................. 411/399 |
| 2006/0275098 A1 * | 12/2006 | Kramer .................... 411/155 |

FOREIGN PATENT DOCUMENTS

| | | |
|---|---|---|
| GB | 1146816 | 3/1969 |

* cited by examiner

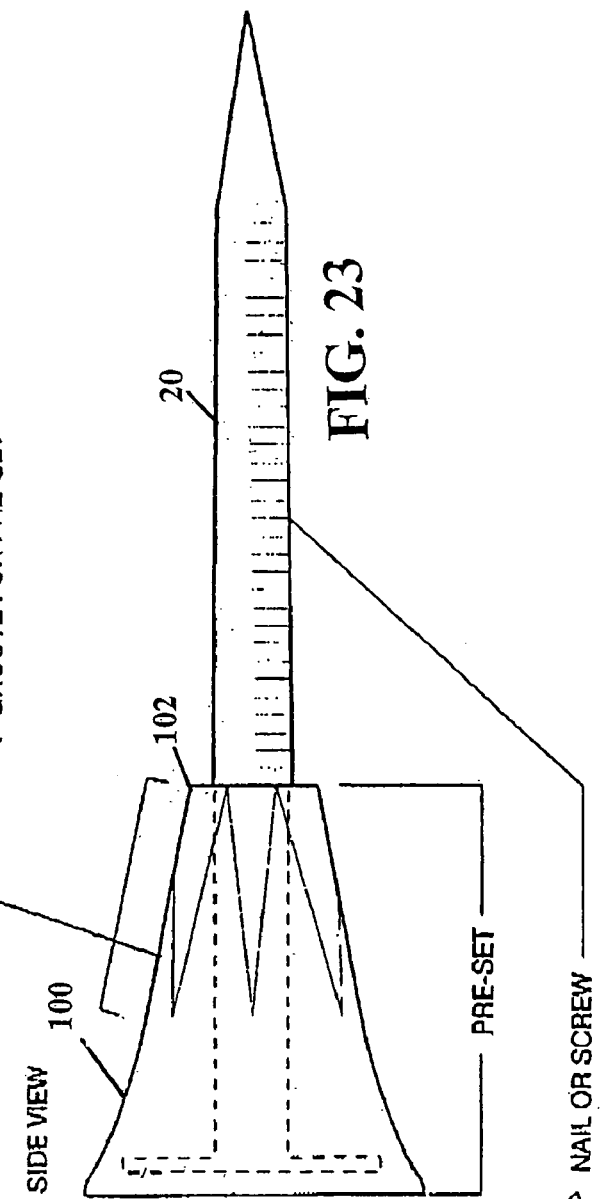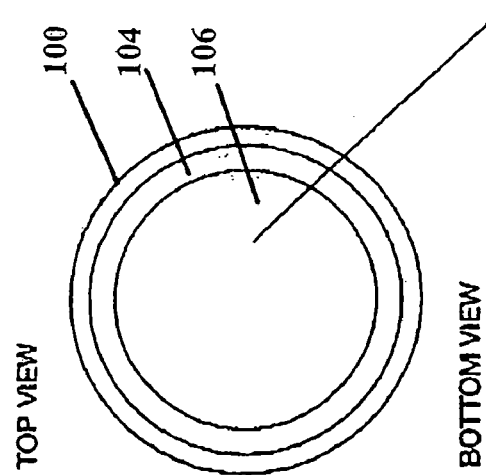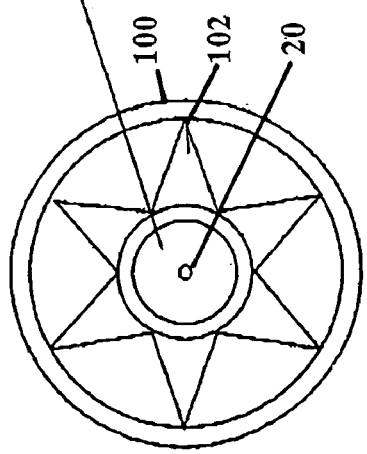
FIG. 23
FIG. 25
FIG. 24

PRESET DEPTH ADAPTER AND FINGER GUARD FOR SCREWS AND NAILS WHEN INSTALLING SHEETROCK

CROSS REFERENCE TO RELATED APPLICATION

This application is a Continuation-In-Part of International application PCT/US2005/024805 filed Jul. 13, 2005, now International Publication WO 2006/019786, and claims priority from U.S. application Ser. No. 10/894,467 filed Jul. 19, 2004, now abandoned, the contents of which are herein incorporated by reference.

BACKGROUND OF THE INVENTION

Field of the Invention

The present invention relates generally to screw and flail fastening elements and, more specifically, to a preset depth adapter that is used with screws or nails when installing sheetrock to insure that the screws and nails are uniformly countersunk into the sheetrock at the proper depth. The preset depth adapter of the present invention has a flared body that is narrow at the bottom with a wider top portion and a central recess extending there through. The present invention comes in a variety of sizes wherein the depth from top to bottom is slightly less than the thickness of common sheetrock used in the industry. The shaft of the screw or nail is inserted through the top of the recess until the head rests there against. The screw or nail is installed and cannot be driven any further once the bottom of the preset depth adapter makes contact with the stud regardless Of whether the stud is wood or steel. This results in each screw or nail being countersunk to the proper depth and prevents the hardware from being driven too far into the sheetrock and compromising the fastening integrity thereof. The flared shape of the present invention forms a plug that assures an absolute bond to the sheetrock.

The preset depth adapter for nails has a flat surface countersunk into the top portion for receiving the head of the nail while the preset depth adapter fur screws has a tapered entrance to the central recess to accommodate the transitional portion of the screw between the head and the shaft. The preset depth adapter for screws is drawn directly into the sheetrock as the screw rotates freely therein thus pulling the face paper of the sheetrock into resultant void and tucking it cleanly between the sheetrock and the present invention as opposed to the sheared face paper that occurs iii the prior art due to the rotating screw head penetrating the sheetrock.

The present invention will not penetrate the sheetrock in the event that the stud is missed since the screw just spins therein and is unable to draw the screw forward. description of the Prior Art There are other accessory devices designed for screws and nails. Typical of these is International Pat. No. 737,968 issued to E. Bielstin, et al. on 5 Oct. 1955.

Another patent was issued to H. Aktiengesellschaft on 26 Mar. 1969 as International Pat. No. 1,146,816. U.S. Pat. No. 2,048,234 was issued to E. M. Tucker on Jul. 21, 1936 and still yet another was issued on Sep. 4, 1956 to J. E. Williams et al. as U.S. Pat. No. 2,761,348.

Mother patent was issued to H. Z. Rosenberg, Jr. on Jun. 16, 1964 as U.S. Pat. No. 3,137,195. Yet another U.S. Pat. No. 3,320,845 was issued to P. Eschweiler on May 23, 1967. Another was issued to A. G. Bakoledis on Sep. 7, 1976 as U.S. Pat. No. 3,978,759 and still yet another was issued on Sep. 1, 1981 to F. J. Harris as U.S. Pat. No. 4,286,496.

Another patent was issued to T. Bredal on Sep. 9, 1986 as U.S. Pat. No. 4,610,589. Yet another U.S. Pat. No. 4,979,858 was issued to Van Allman, et al. on Dec. 25, 1990. Still another was issued to M. J. Rotter on Apr. 30, 1996 as U.S. Pat. No. 5,511,918. Another was issued on Apr. 29, 1997 to Janssen et al. as U.S. Pat. No. 5,624,220.

Another was issued to P. Meylan On Oct. 14, 1997 as U.S. Pat. No. 5,676,511. Mother was issued oft May 16, 2000 to L. D. Pope as U.S. Pat. No. 6,062,789.

While these fasteners may be suitable for the purposes for which they were designed, they would not be as suitable for the purposes of the present invention, as hereinafter described.

SUMMARY OF THE PRESENT INVENTION

The present invention discloses a present depth adapter having a flared body that is narrow at the bottom with a wider top portion and a central recess or throughbore extending therethrough. The present invention comes in a variety of sizes wherein the depth from top to bottom is slightly less than the thickness of common sheetrock used in the industry. The shaft of the screw or nail is inserted through the top of the recess until the head rests thereagainst. The screw or nail is installed and cannot be driven any further once the bottom of the preset depth adapter makes contact with the stud regardless of whether the stud is wood or steel. This results in each screw or nail being countersunk to the proper depth and prevents the hardware from being driven too far into the sheetrock and compromising the fastening integrity thereof. The flared shape of the present invention forms a plug that assures an absolute bond to the sheetrock. The preset depth adapter for nails has a flat surface countersunk into the top portion for receiving the head of the nail while the preset depth adapter for screws has a tapered entrance to the central recess to accommodate the transitional portion of the screw between the head and the shaft. The preset depth adapter for screws is drawn directly into the sheetrock as the screw rotates freely therein thus pulling the face paper of the sheetrock into resultant void and tucking it cleanly between the sheetrock and the present invention as opposed to the sheared face paper that occurs in the prior art due to the rotating screw head penetrating the sheetrock.

A primary object of the present invention is to provide a preset depth spacer for installing screws and nails into sheetrock that will assure that all screws or nails are countersunk to the appropriate depth Another object of the present invention is to provide a preset depth spacer for installing screws and nails into sheetrock that is available in a plurality of sizes to substantially correspond with the thickness of the sheetrock to be installed.

Still another object of the present invention is to provide a preset depth spacer for installing screws and nails into sheetrock wherein each size is ⅛" less than the thickness of the sheetrock to be installed.

Yet another object of the present invention is to provide a preset depth spacer for installing screws and nails into sheetrock wherein the different sized depth spacers are color-coded.

Still yet another Object of the present invention is to provide a preset depth spacer for installing screws and nails into sheetrock that can be adapted for use on screw and nail sticks arid coils for application with self-feeding installation guns.

Another object of the present invention is to provide a preset depth spacer for installing screws and nails into sheetrock that serves as a finger guard when driving strews with a typical screw gun wherein the user holds the stationary preset depth spacer while driving the screw which rotates therein rather than holding the screw as is done in the prior art.

Yet another object of the present invention is to provide a preset depth spacer for installing screws and nails into sheetrock that is simple and easy to use.

Still yet another object of the present invention is to provide a preset depth spacer for installing screws and nails into sheetrock that is inexpensive to manufacture and operate.

Additional objects of the present invention will appear as the description proceeds.

The foregoing and other objects and advantages will appear from the description to follow. Bi the description reference is made to the accompanying drawings, which forth a part hereof, and ill which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 23 is a side view of another preset and nail according to the present invention.

FIG. 24 is a first end view of the preset shown in FIG. 23.

FIG. 25 is a second end view of the preset shown in FIG. 23.

LIST OF REFERENCE NUMERALS

Figure 1:
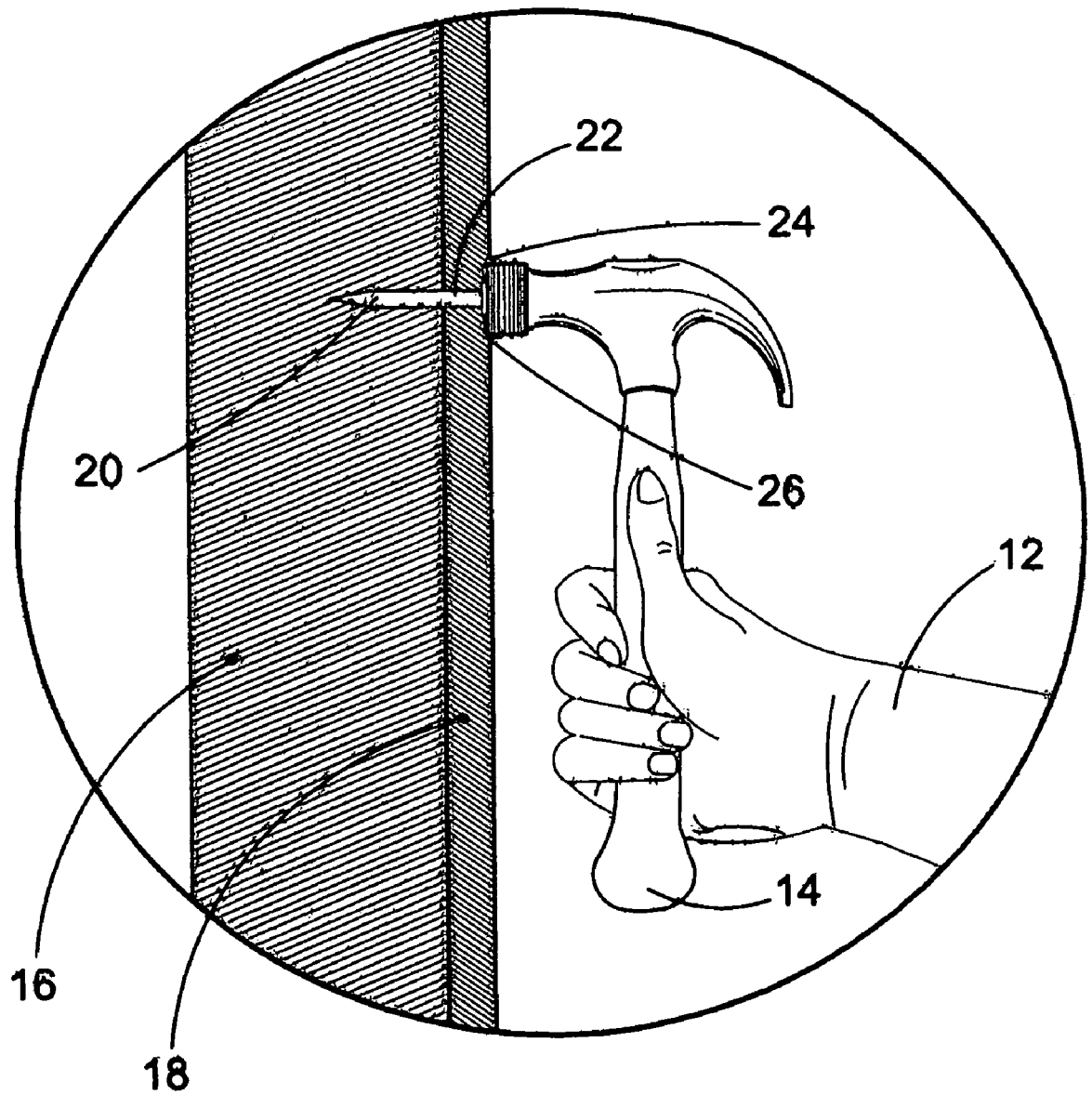
FIG. 1 is an illustrative view of the prior art using nail fasteners.

With regard to reference numerals used, the following numbering is used throughout the drawings.
10 present invention
12 user
14 hammer
16 stud
18 sheetrock
20 nail
22 nail head
24 facing paper on sheetrock
26 damage
28 drill
30 drill bit
32 screw
34 screw head
36 short spacer for nails
37 alternate short spacer for nails
38 long spacer for nails
39 alternate long spacer for nails
40 short spacer for screws
42 long spacer for screws
44 flat surface
46 top portion
48 tapered entrance
50 throughbore
52 backing paper
54 void
56 ceiling joint
58 gap
60 fingers
62 lacerations
64 long spacer for stick nails
66 flat portion
68 bottom portion
69 nail gun

DETAILED DESCRIPTION OF THE PREFERRED EMBODIMENT

Turning now descriptively to the drawings, in which similar reference characters denote similar elements throughout the several views wherein the figures illustrate the present invention wherein a cigar holder and ash holder are disclosed Turning to FIG. 1, shown therein is an illustrative view of the prior aft using nail fasteners. Shown are a user's hand 12, hammer 14, stud 16, sheetrock 18, a nail 20, nail head 22 forced too deep, the sheetrock paper ripped at 24, and damage 26 to the sheetrock.

Figure 2:
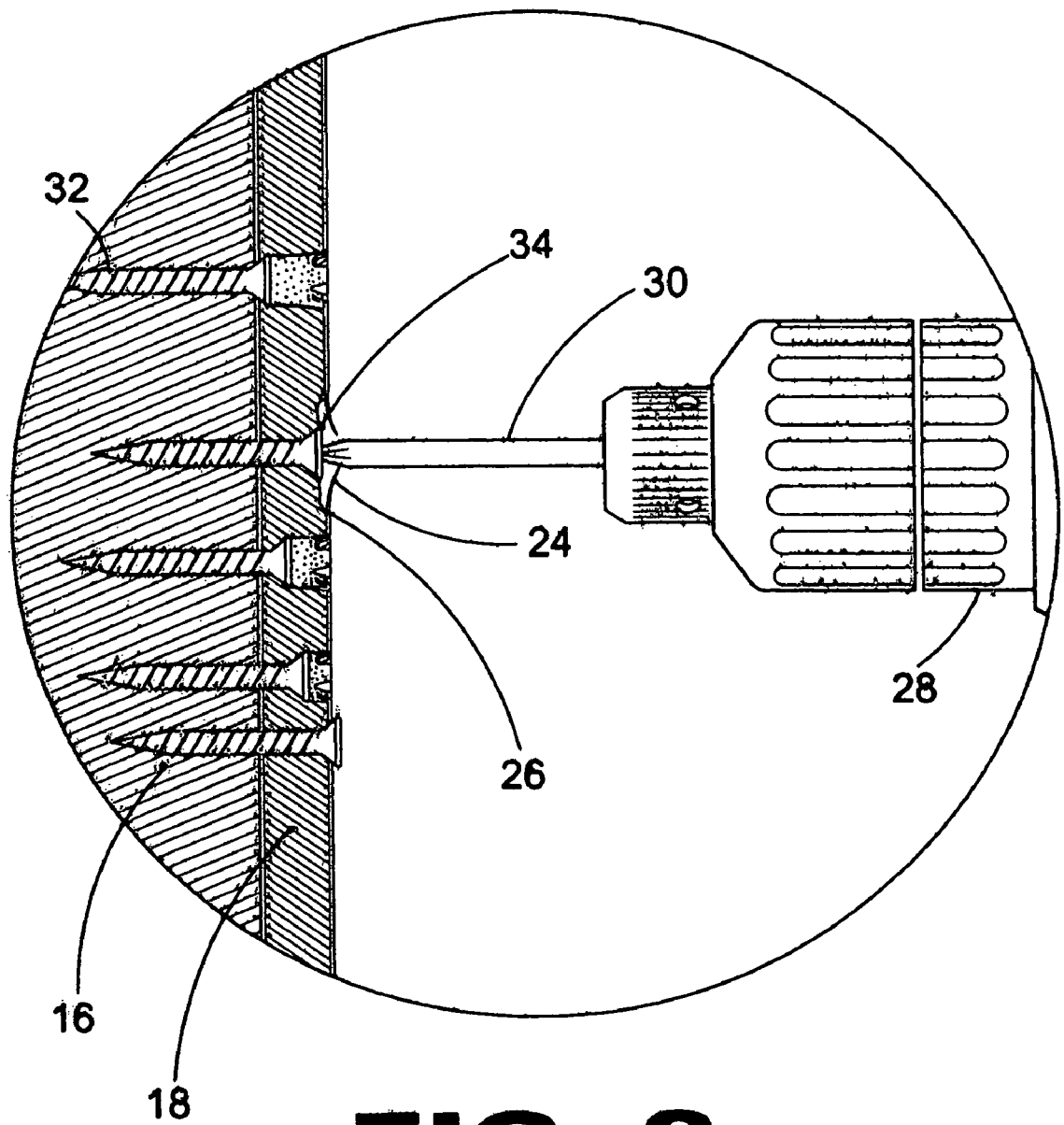
FIG. 2 is a detailed view of the prior art using screw fasteners.

Turning to FIG. 2, shown therein is a detailed view of the prior art using screw fasteners. Shown are a drill 28, drill bit 30, screw 32, and the screw head 34 forced too deep. Other previously disclosed items are also shown.

Figure 3:
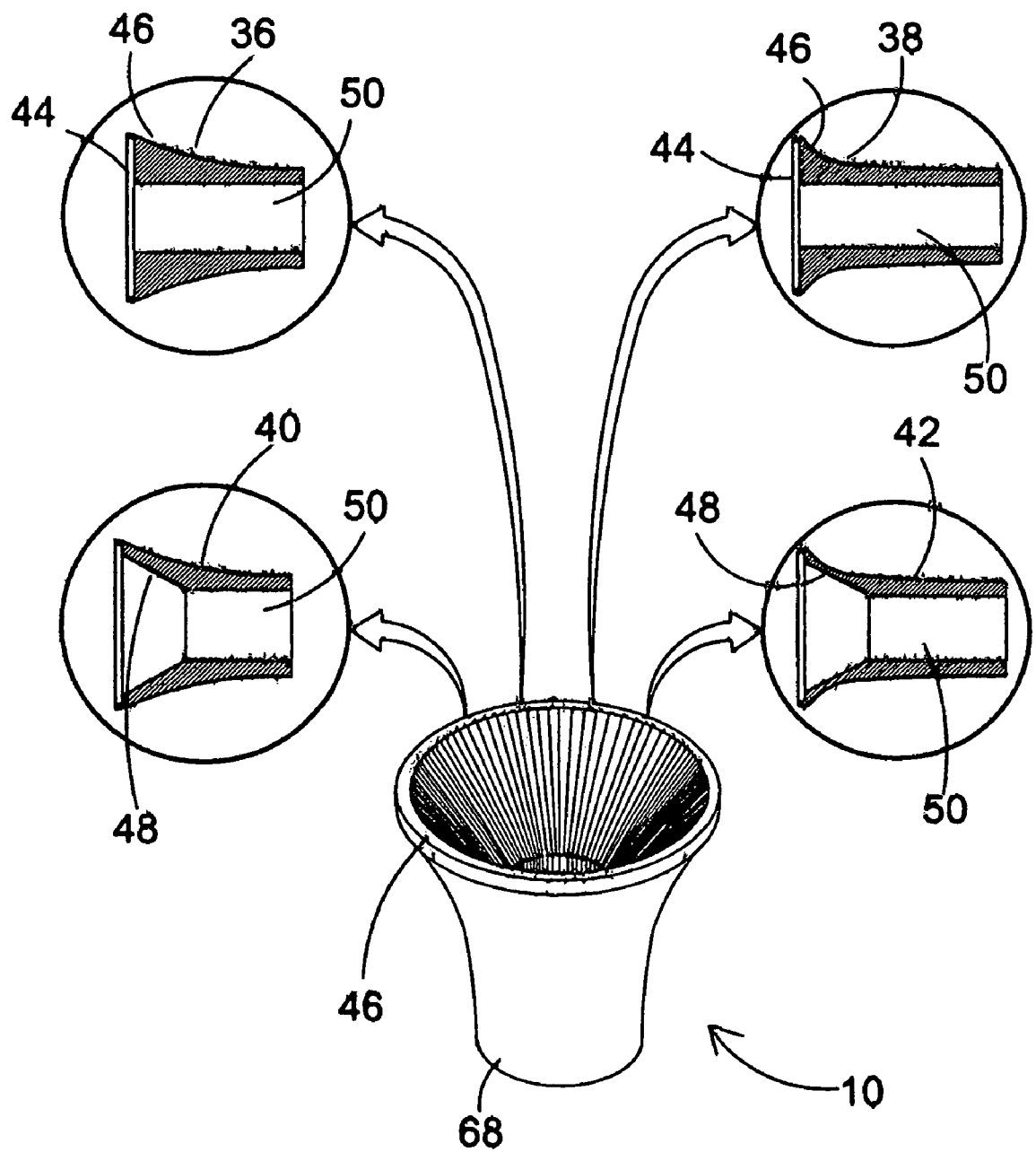
FIG. 3 is a detailed view of various preset depth spacers of the present invention.

Turning to FIG. 3, shown therein is a detailed view of various preset depth spacers of the present invention 10. Shown are a short spacer 36 for nails, a long spacer 38 for nails, a short spacer 40 for screws and a long spacer 42 for screws. The depth adapter 10 has a flared body that is narrow at the bottom 68 with a wider top portion 46 and a central recess or throughbore 50 extending therethrough. The present invention 10 comes in a variety of sizes wherein the depth from top to bottom is slightly less than the thickness of common sheetrock used in the industry. The shaft of the screw or nail is inserted through the top of the recess 50 until the head rests thereagainst. The screw or nail is installed and cannot be driven any further once the bottom 68 of the preset depth adapter makes contact with the stud regardless of whether the stud is wood or steel. This results in each screw or nail being countersunk to the proper depth and prevents the hardware from being driven too far into the sheetrock arid compromising the fastening integrity thereof. The flared shape of the present invention 10 forms a plug that assures an absolute bond to the sheetrock. The preset depth adapter 10 for nails 36, 38, has a flat surface 44 countersunk into the top portion 46 for receiving the head of the nail while the preset depth adapter for screws 40, 42 has a tapered entrance 48 to the central recess 50 to accommodate the transitional portion of the screw between the head and the shaft. The preset depth adapter for screws 40, 42 is drawn directly into the sheetrock as the screw rotates freely therein thus pulling the face paper of the sheetrock into resultant void and tucking it cleanly between the sheetrock and the present invention as opposed to the sheared face paper that occurs in the prior art due to the rotating screw head penetrating the sheetrock. The present invention 10 may comprise metal or plastic.

Figure 4:
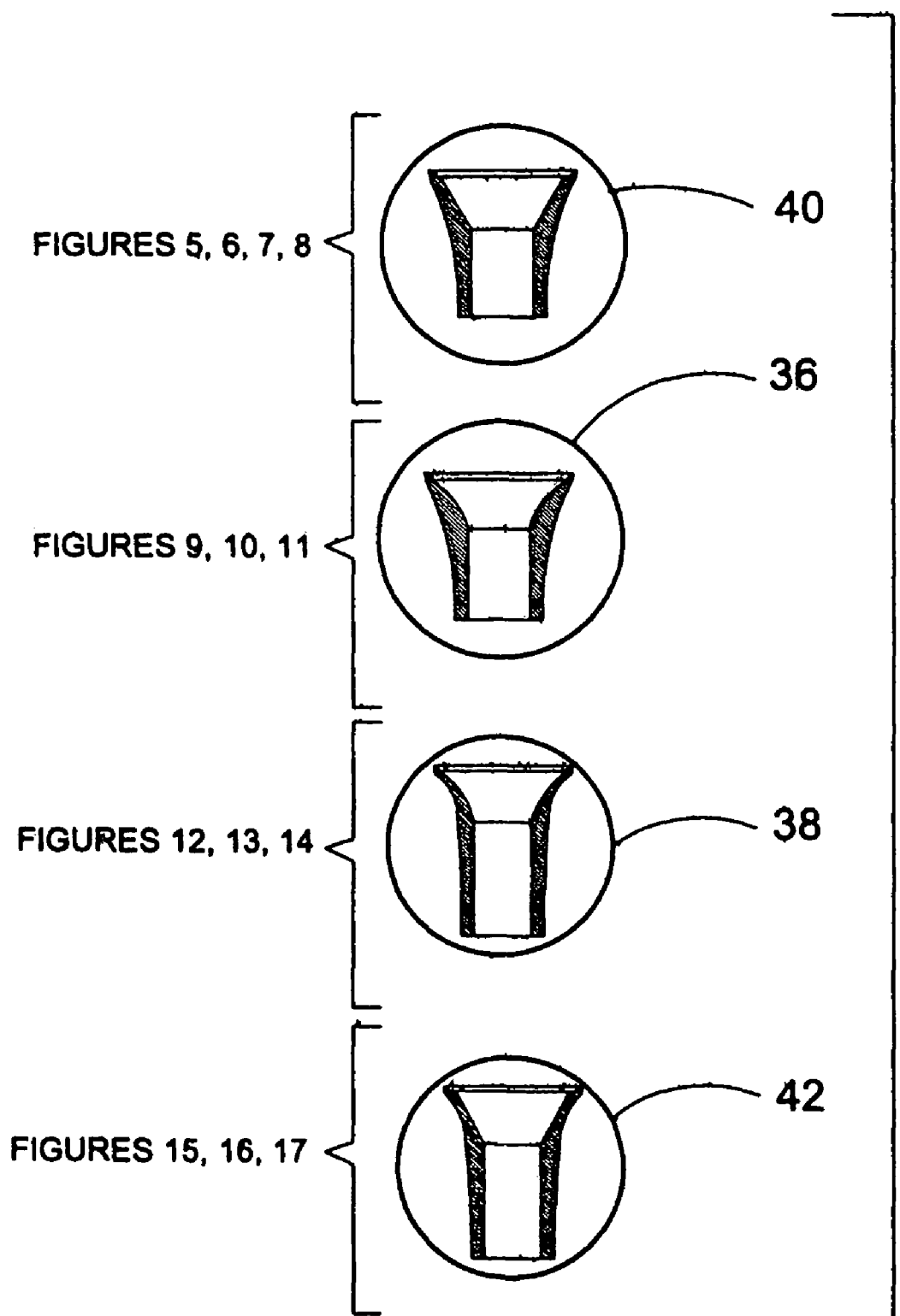
FIG. 4 is a locator chart of the preset depth spacers of the present invention.

Turning to FIG. 4, shown therein is a locator chart of the preset depth spacers of the present invention 10 showing embodiments 36, 38, 40 and 42. The present invention 10 is provided in different lengths including 9/16, 7/16 and 5/16 inches with each being in a different color.

Figure 4A:
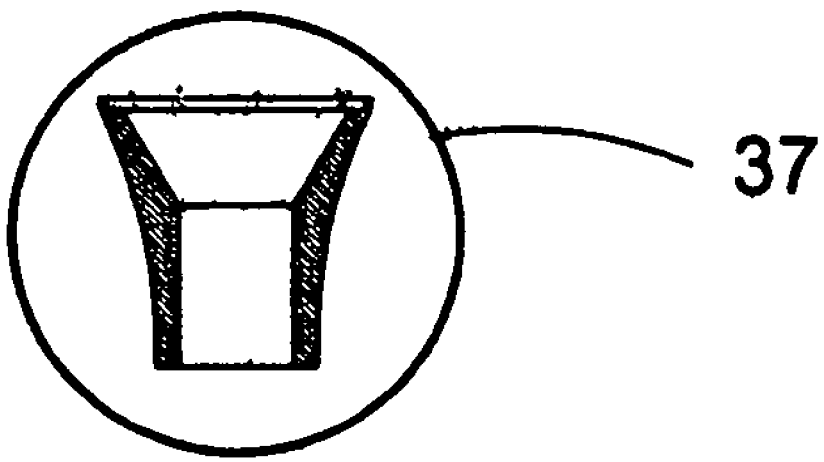
FIG. 4A is a side view of an alternate small preset depth spacer for nails and an alternate large preset depth spacer for nails.
Figure 4A:
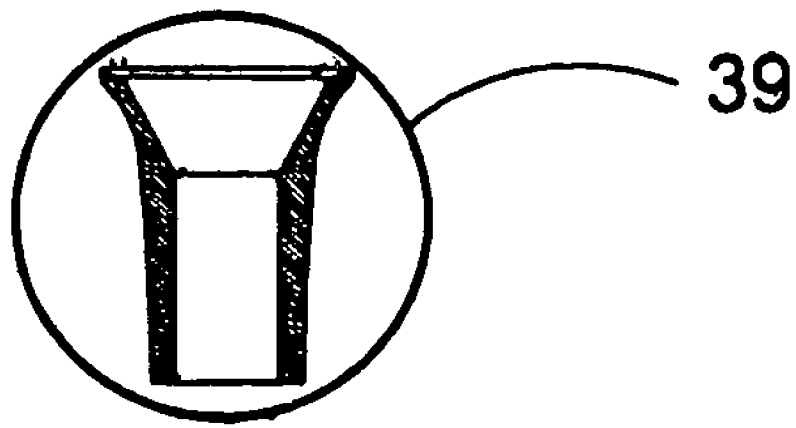

Turning to FIG. 4A shown therein is a side view of an alternate small preset depth spacer for nails 37 and an alternate large preset depth spacer for nails 39 wherein they are configure similar to the preset depth spacers for screws. Nails could be made to look like a screw whereas the nail head tapers like the head of a screw so when a gun is used, a nail applied to a deeper depth would spread the preset bushing at the top as it finds it's depth.

Figure 5:
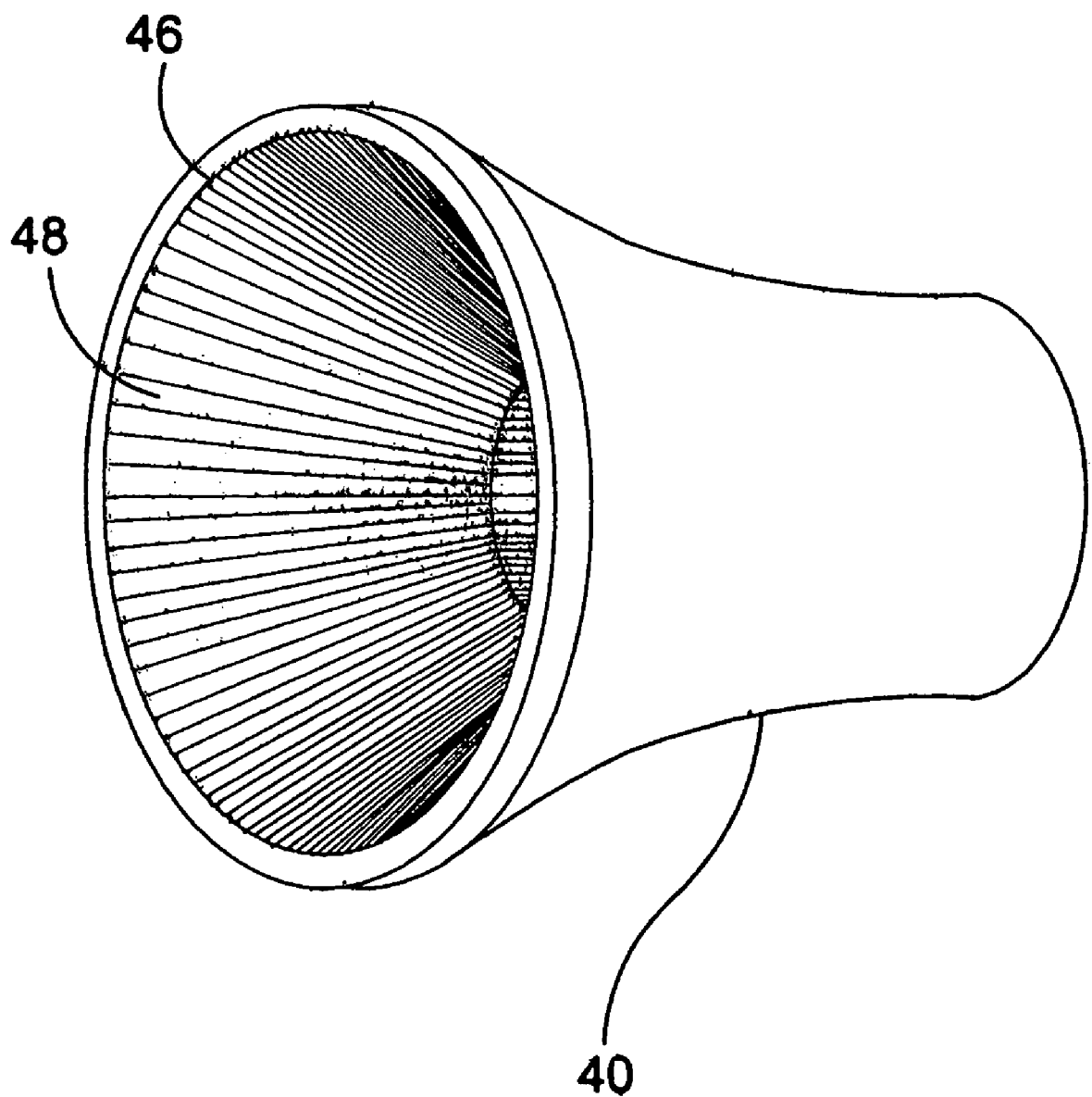
FIG. 5 is a perspective view of the small preset depth spacer and finger guard of the present invention.
Figure 6:
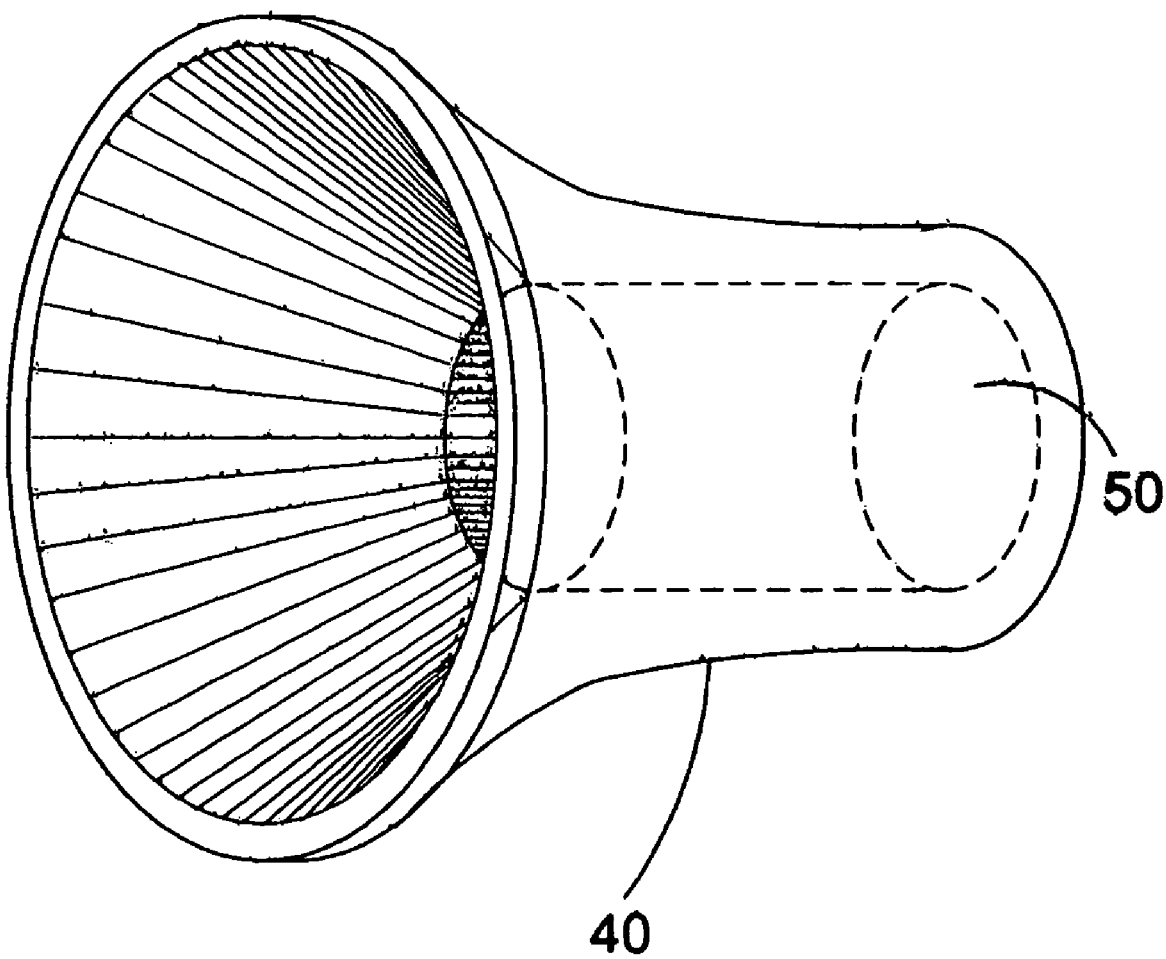
FIG. 6 is a perspective view of the small preset depth spacer and finger guard of the present invention.
Figure 7:
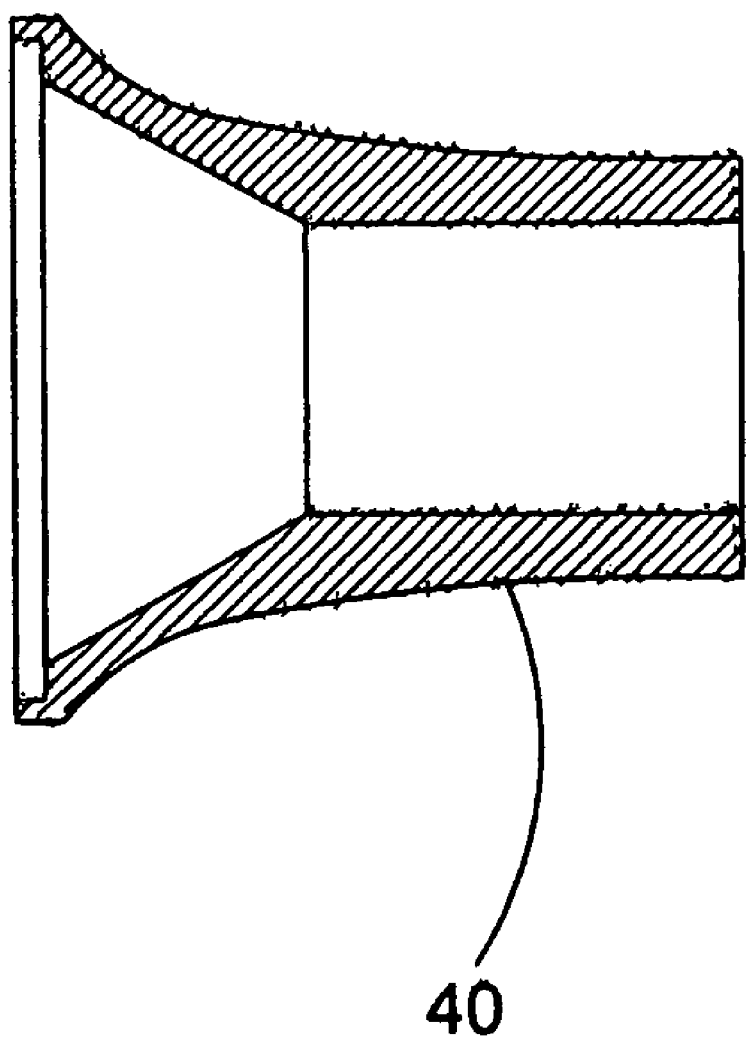
FIG. 7 is a sectional side view of the small preset depth spacer and finger guard of the present invention.

Turning to FIGS. 5, 6 and 7, shown therein is a perspective view of the small preset depth spacer and finger guard 40 of the present invention. Shown are previously disclosed items.

Figure 8:
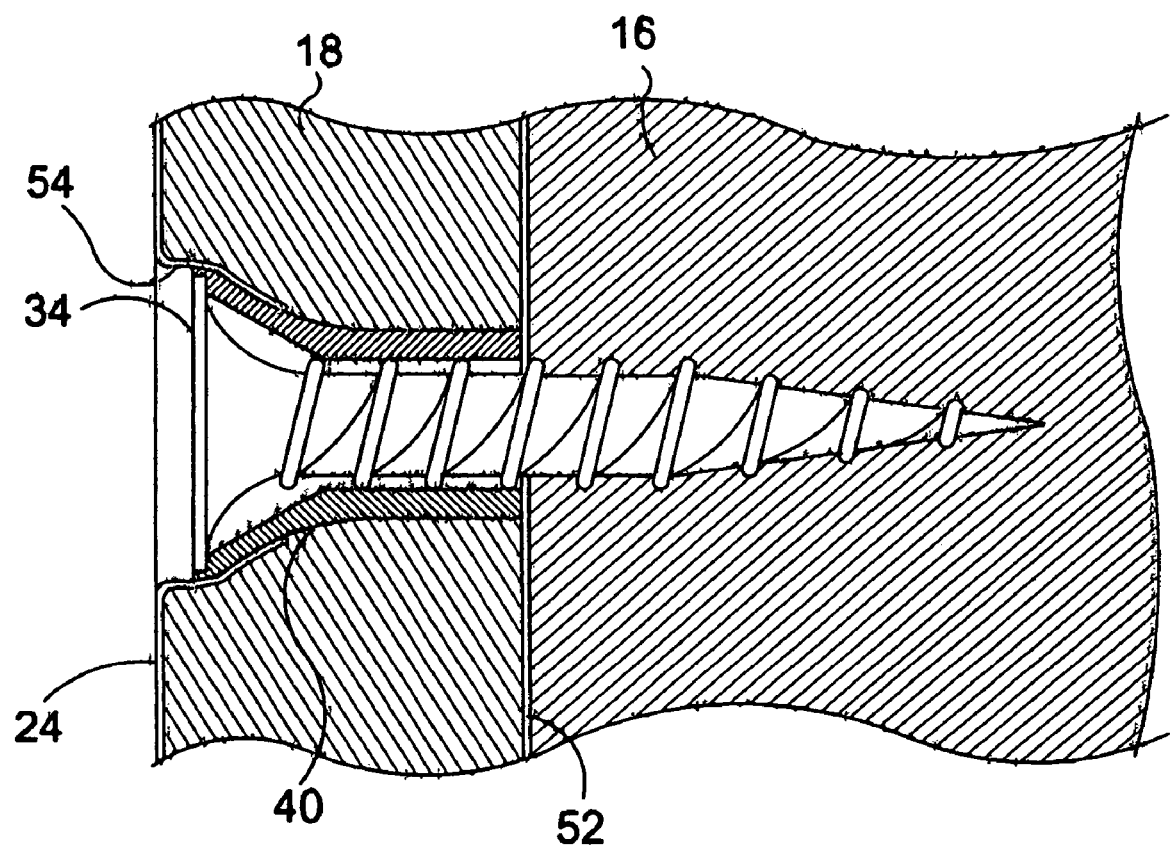
FIG. 8 is a sectional side view of the small preset depth spacer of the present invention in use.

Turning to FIG. 8, shown therein is a sectional side view of the small preset depth spacer 40 of the present invention in use. Also shown are stud 16, sheetrock 18, backing paper 52, face paper 24, screw head 34, and the face paper pulled and tucked into void 54 after installation.

Figure 9:
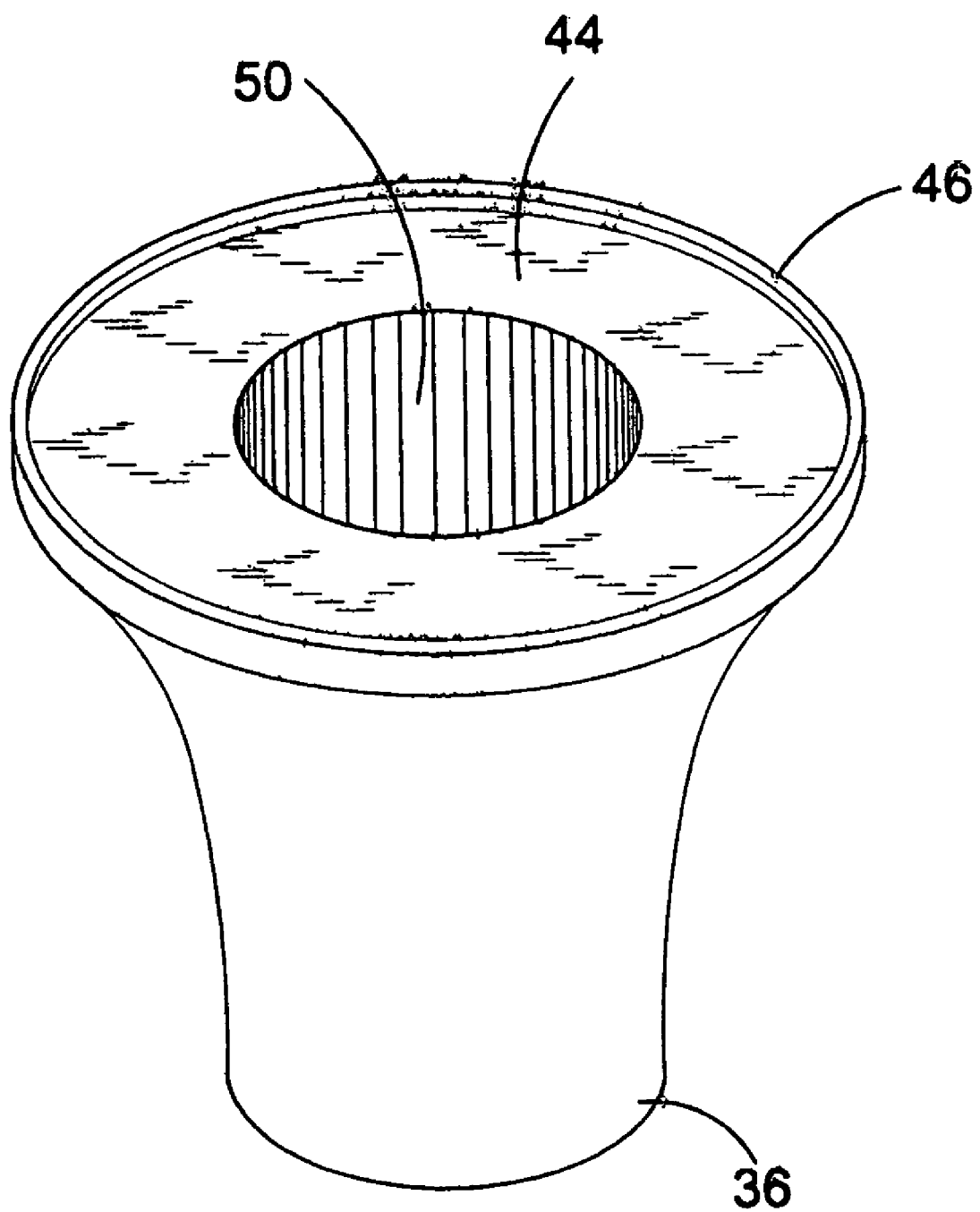
FIG. 9 is a perspective view of the small preset depth spacer for nails.
Figure 10:
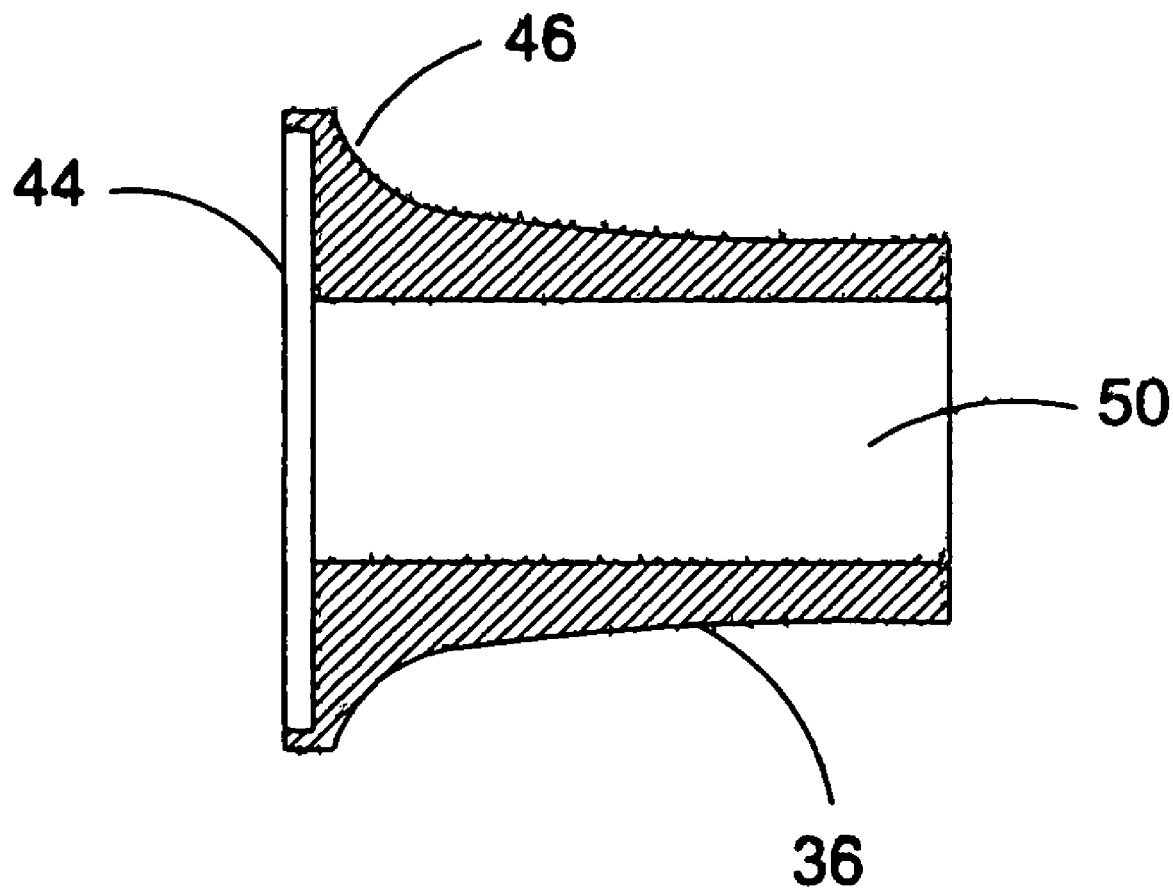
FIG. 10 is a sectional side view of the small preset depth spacer of the present invention.
Figure 11:
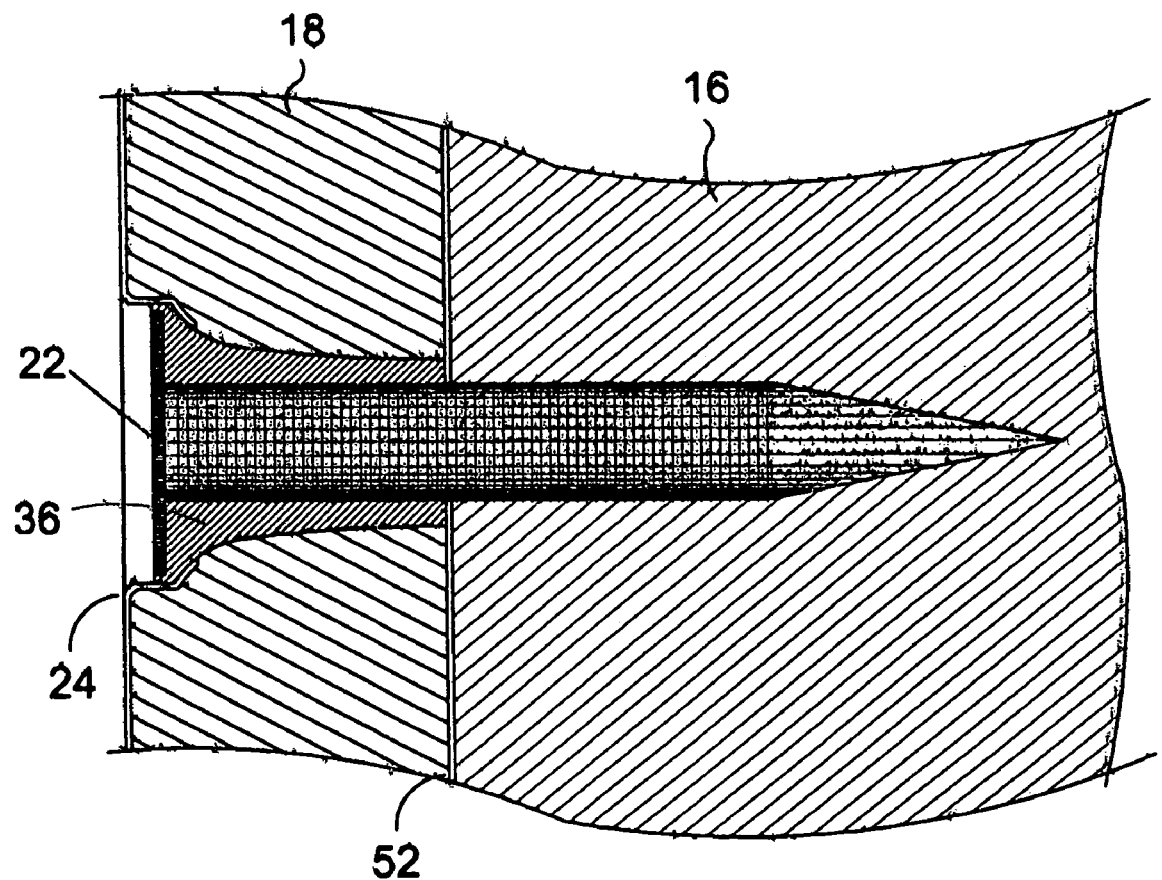
FIG. 11 is a sectional side view of the small preset depth spacer for hails in use.

Turning to FIGS. 9, 10 and 11, shown therein is a perspective view of the small preset depth spacer 36 for nails. Other previously disclosed items are also shown.

Figure 12:
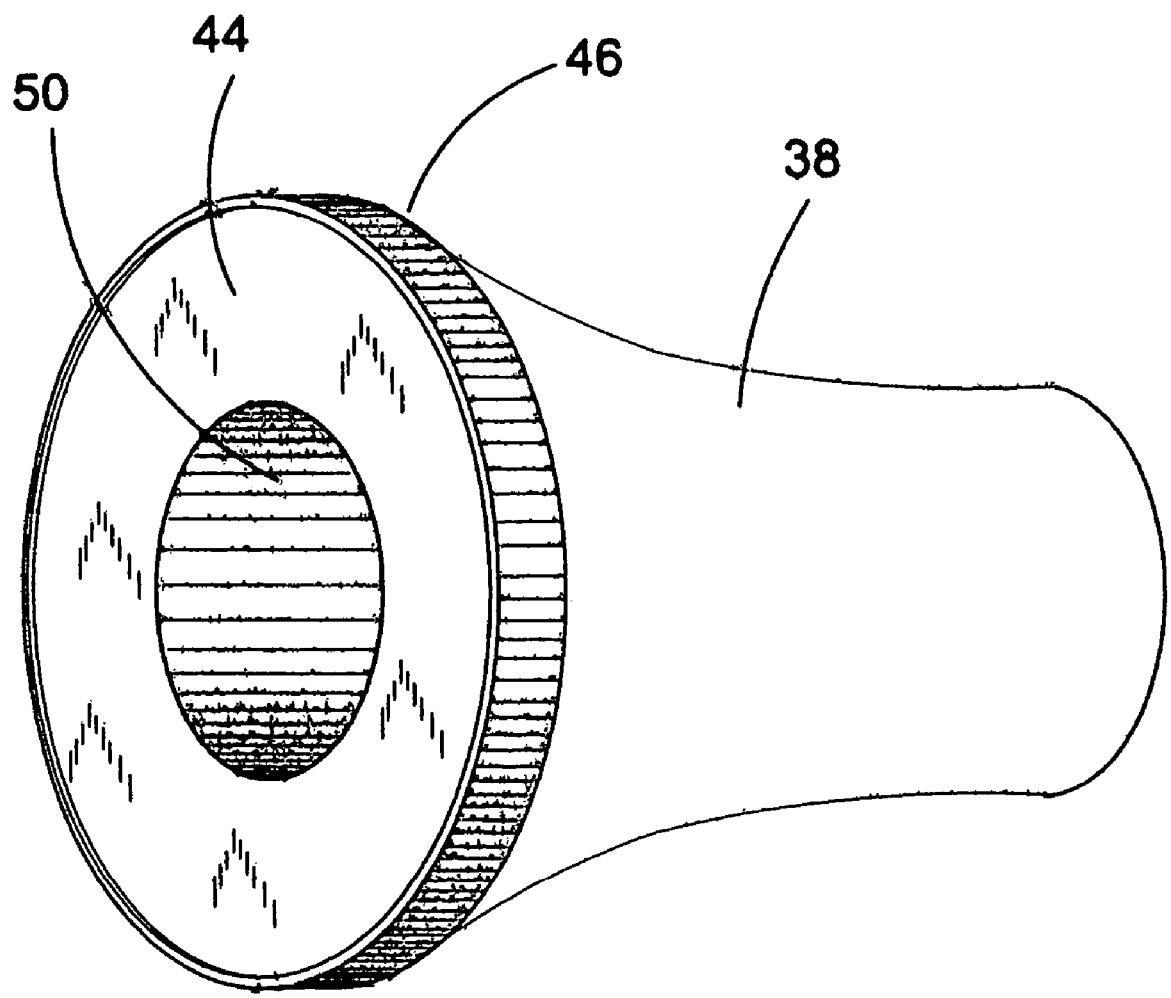
FIG. 12 is a perspective view of the large preset depth spacer for nails.
Figure 13:
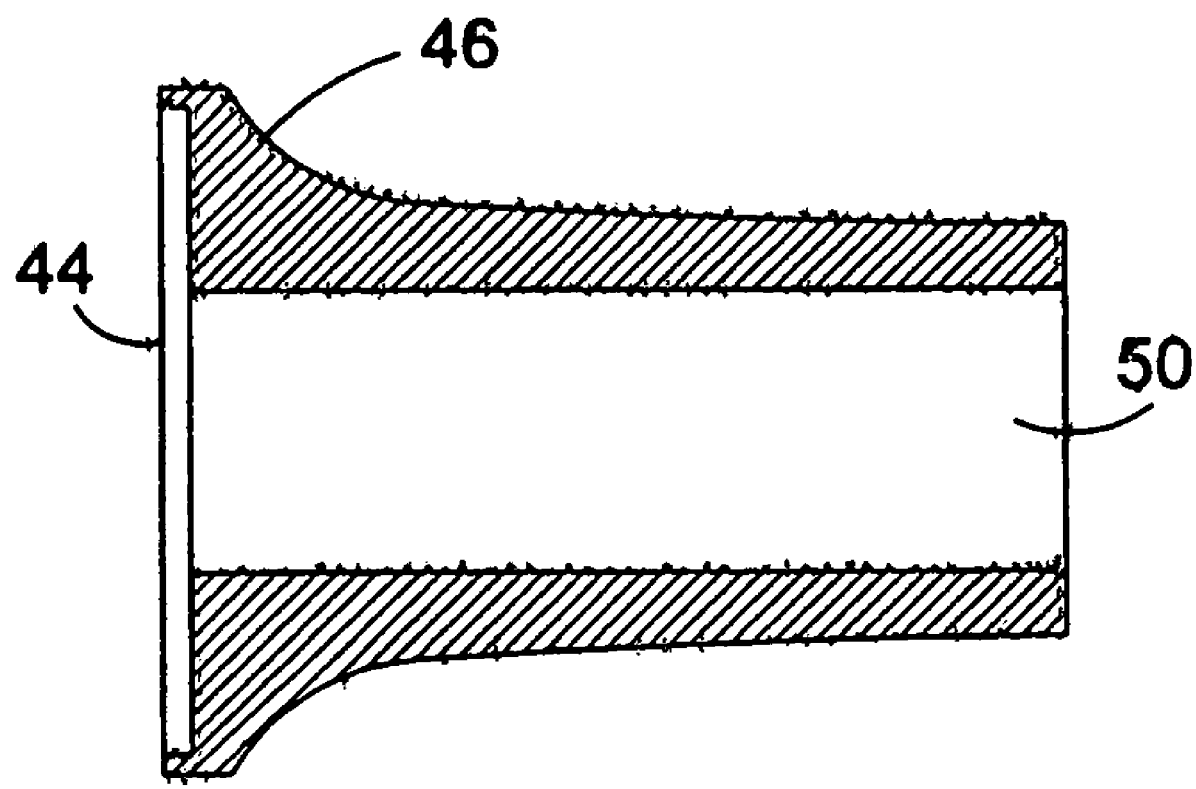
FIG. 13 is a sectional side view of the large preset depth spacer for nails.
Figure 14:
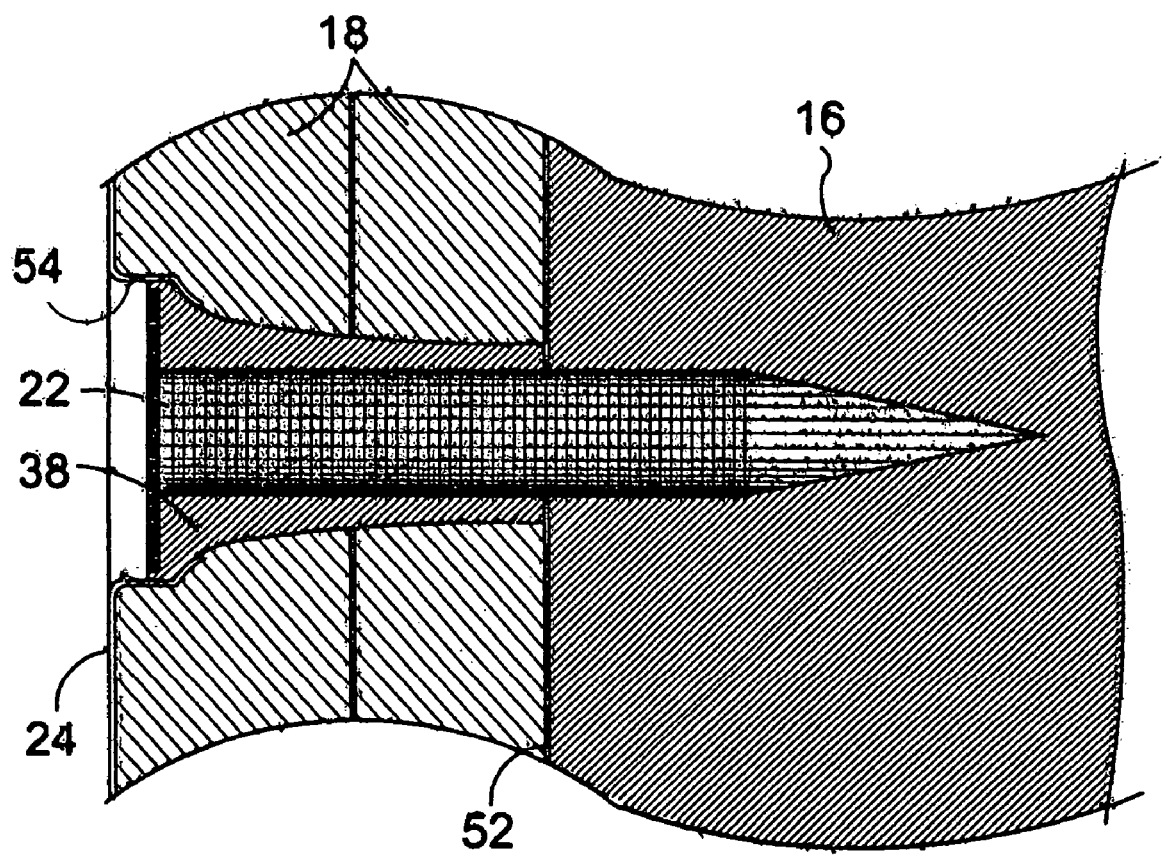
FIG. 14 is a sectional side view of the large preset depth spacer for nails in use.

Turning to FIGS. 12, 13 and 14, shown therein is a perspective view of the large preset depth spacer 38 for nails. Other previously disclosed items are also shown. Note that two pieces of sheetrock 18 are present.

Figure 15:
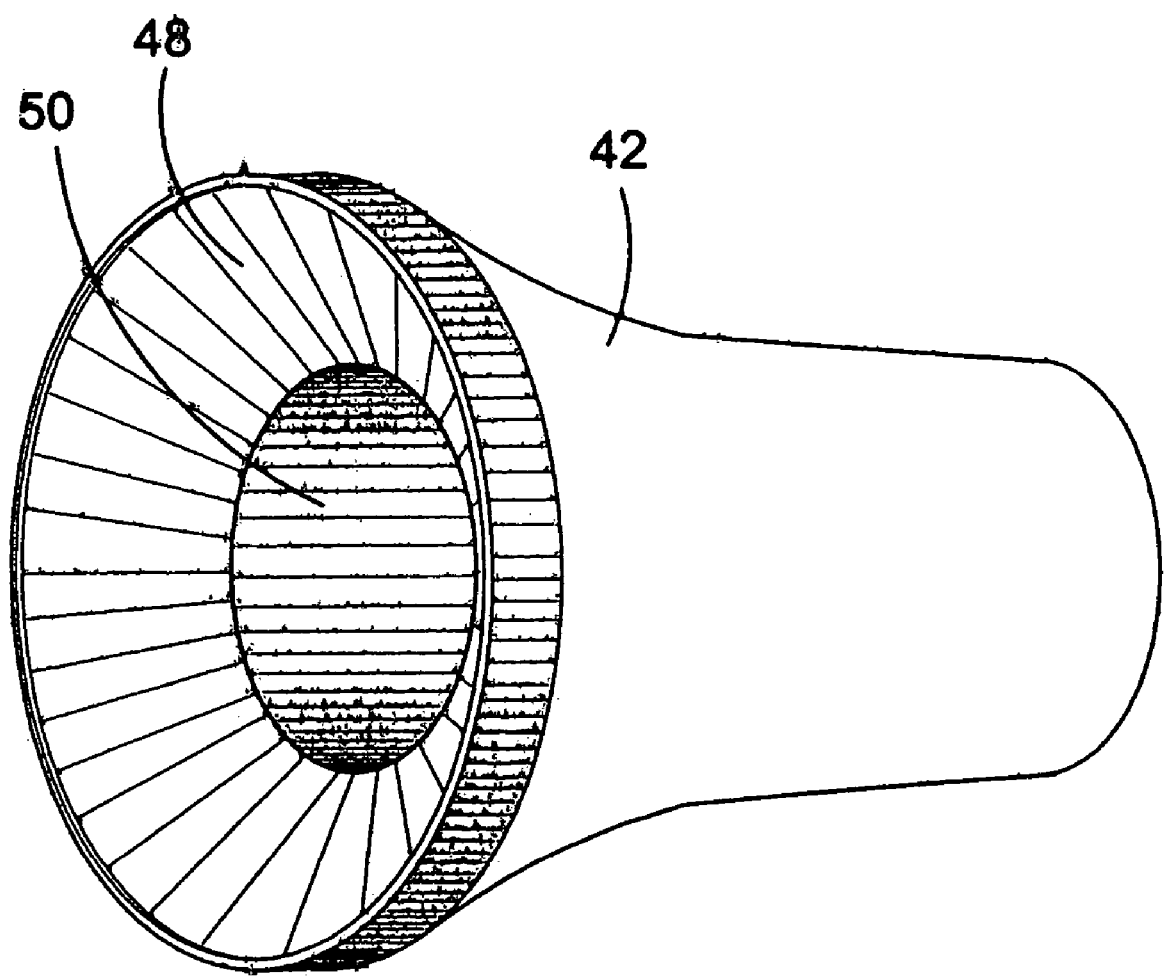
FIG. 15 is a perspective view of the large preset depth spacer and finger guard for screws.
Figure 16:
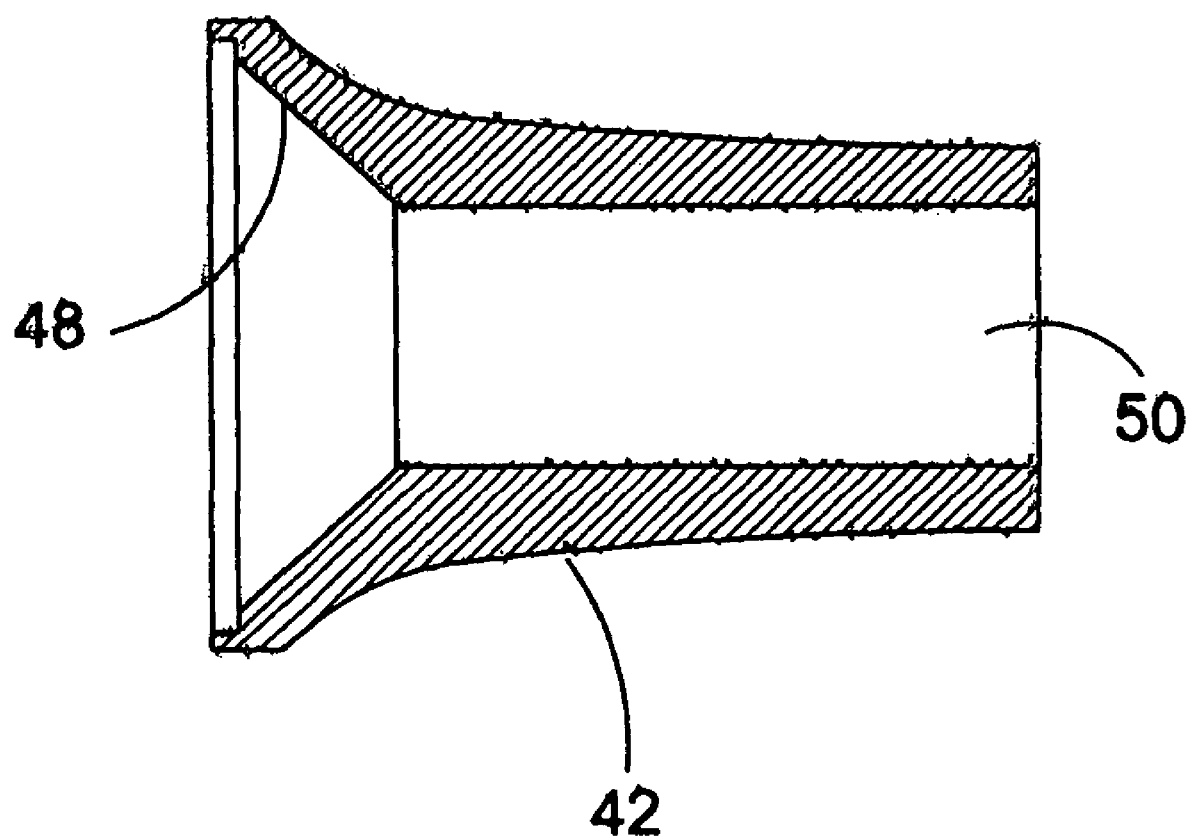
FIG. 16 is a sectional side view of the large preset depth spacer and finger guard for screws.

Turing to FIGS. 15 and 16, shown therein is a perspective view of the large preset depth spacer 42 and finger guard for screws.

Figure 17:
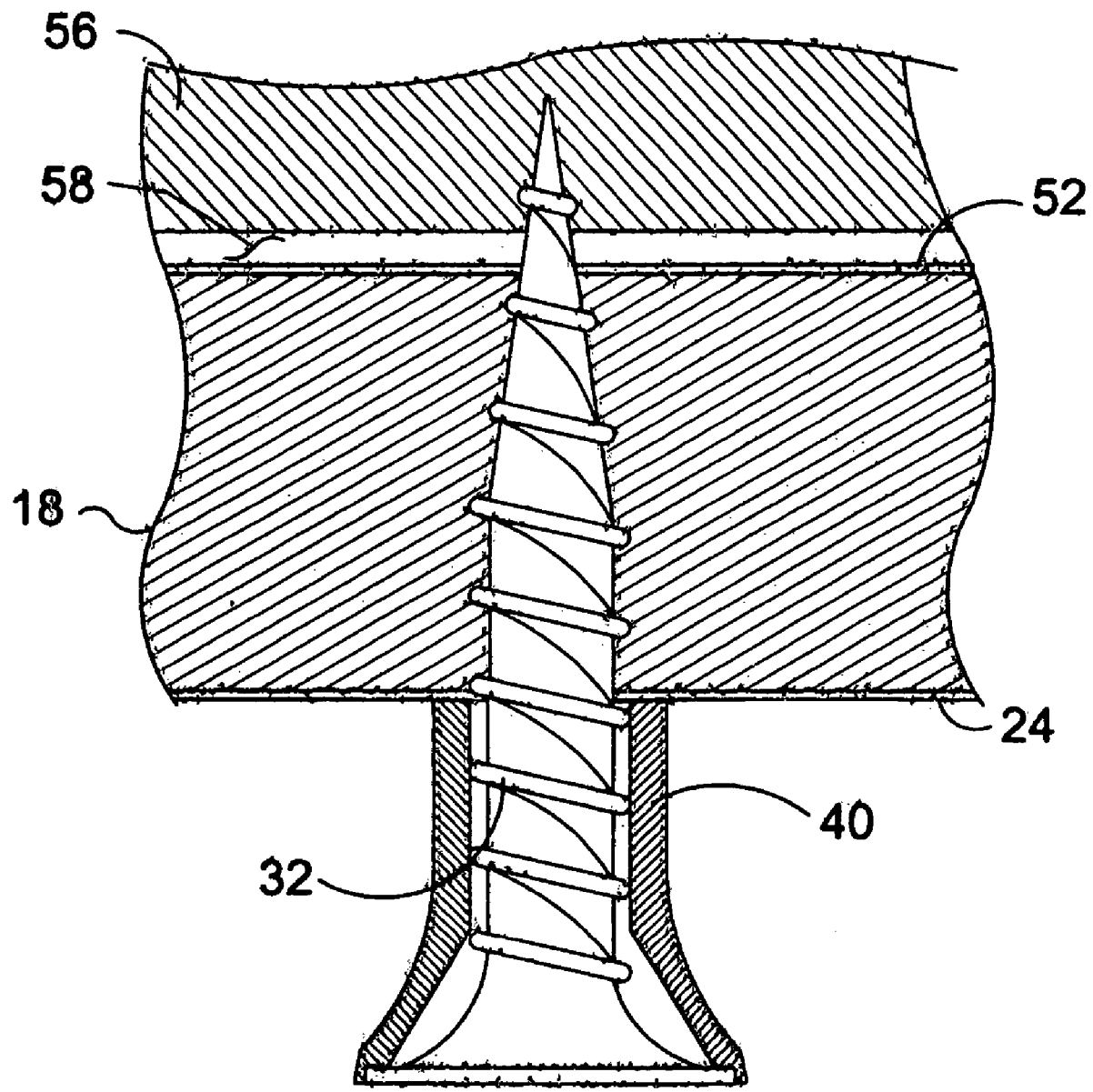
FIG. 17 is a sectional side view of the small preset depth spacer and finger guard for screws in use when installing a ceiling.

Turning to FIG. 17, shown therein is a sectional side view of the small preset depth spacer and finger guard for screws 40 in use when installing a ceiling. Installing sheetrock 18 on a ceiling can be awkward because the installer is often on a ladder and has to position the sheetrock and hold it in place while driving the screws 32. A plurality of screws 32 is typically started into the sheetrock 18 and driven home once the sheetrock is in place. This relieves the installer of the cumbersome task of handling the screw 32 while holding the sheetrock 18. The present invention 40 may be employed with the started screws 32 when installing a ceiling. The screw 32 is driven into the sheetrock 18 until the preset spacer 40 contacts the surface of the sheetrock 18. The increased area and flared plug configuration of the present invention 40 provide improved grabbing ability as opposed to a screw head. Furthermore, the preset spacer 40 assures that the screw 32 isn't overdriven as often happens when using just a screw which results in an inadequate amount of sheetrock 18 bearing the weight Of the board. Also shown are facing paper 24, backing paper 52, ceiling joist 56 and gap 58 between the sheetrock and joist.

Figure 18:
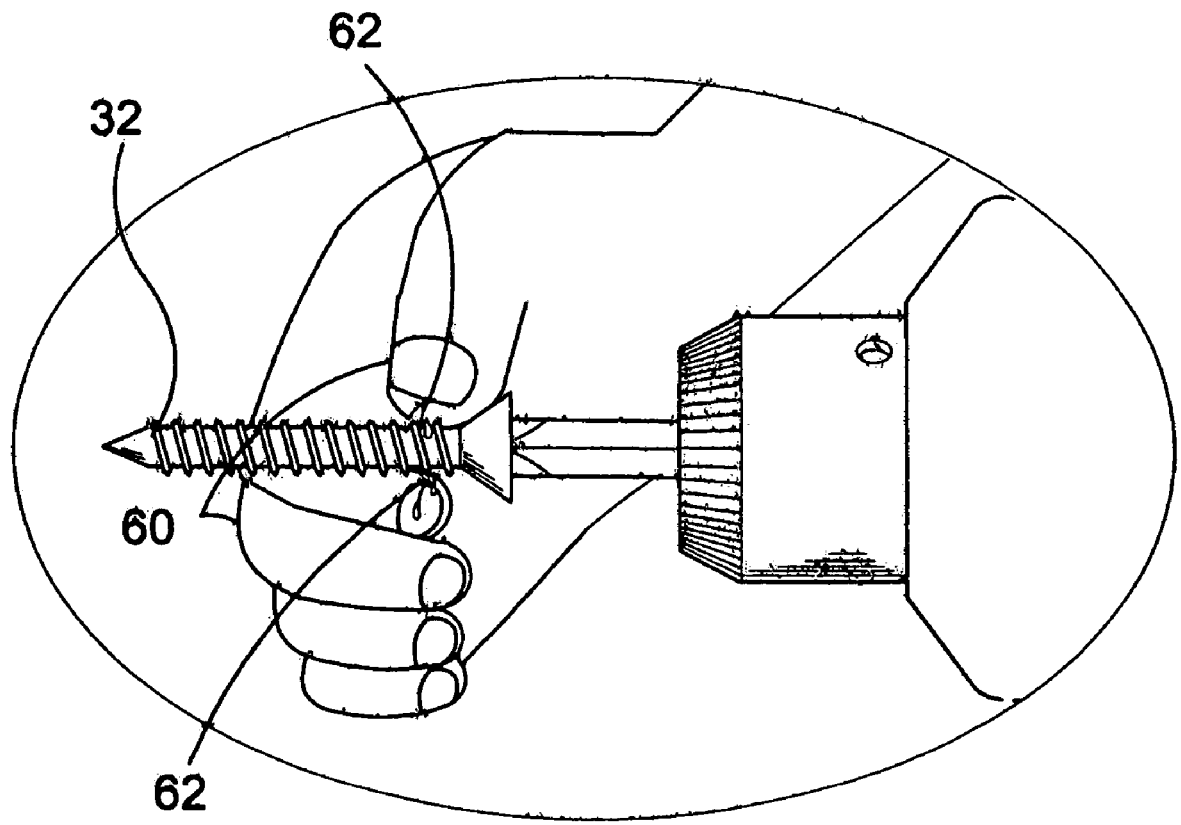
FIG. 18 is a side view of the prior aft in use.

Turning to FIG. 18, shown therein is a side view of the prior aft in use. Screw 32 installation in the prior aft often entails holding the screw until it starts to pull. The rotation of the screw head can damage the user's fingers 60, especially when they have been driving screws over an extended period of time. Lacerations 62 occur to the front of the thumb and index finger while holding the threaded part of the screw.

Figure 19:
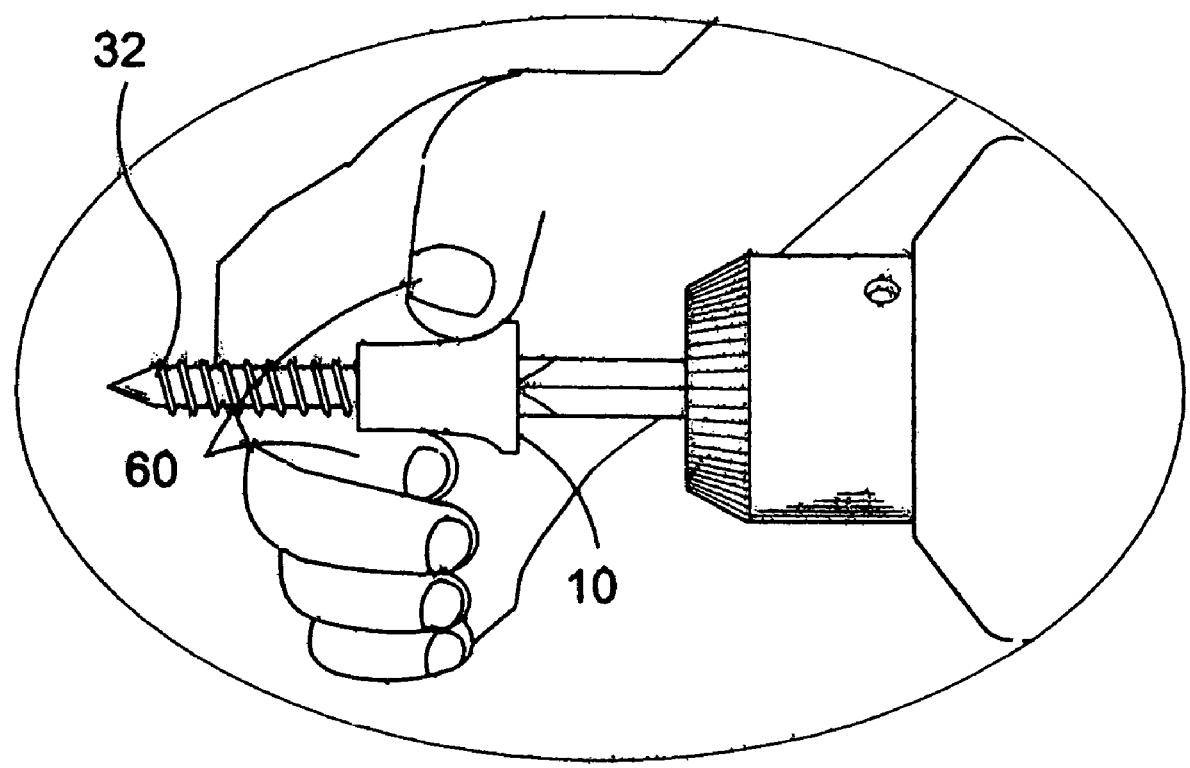
FIG. 19 is a side view of the present invention in use as a finger guard.

Turning to FIG. 19, shown therein is a side view of the present invention 10 in use as a finger guard. The present invention 10 may also be used as a finger 60 guard wherein the user holds the preset screw device as the screw 32 rotates freely therein.

Figure 20:
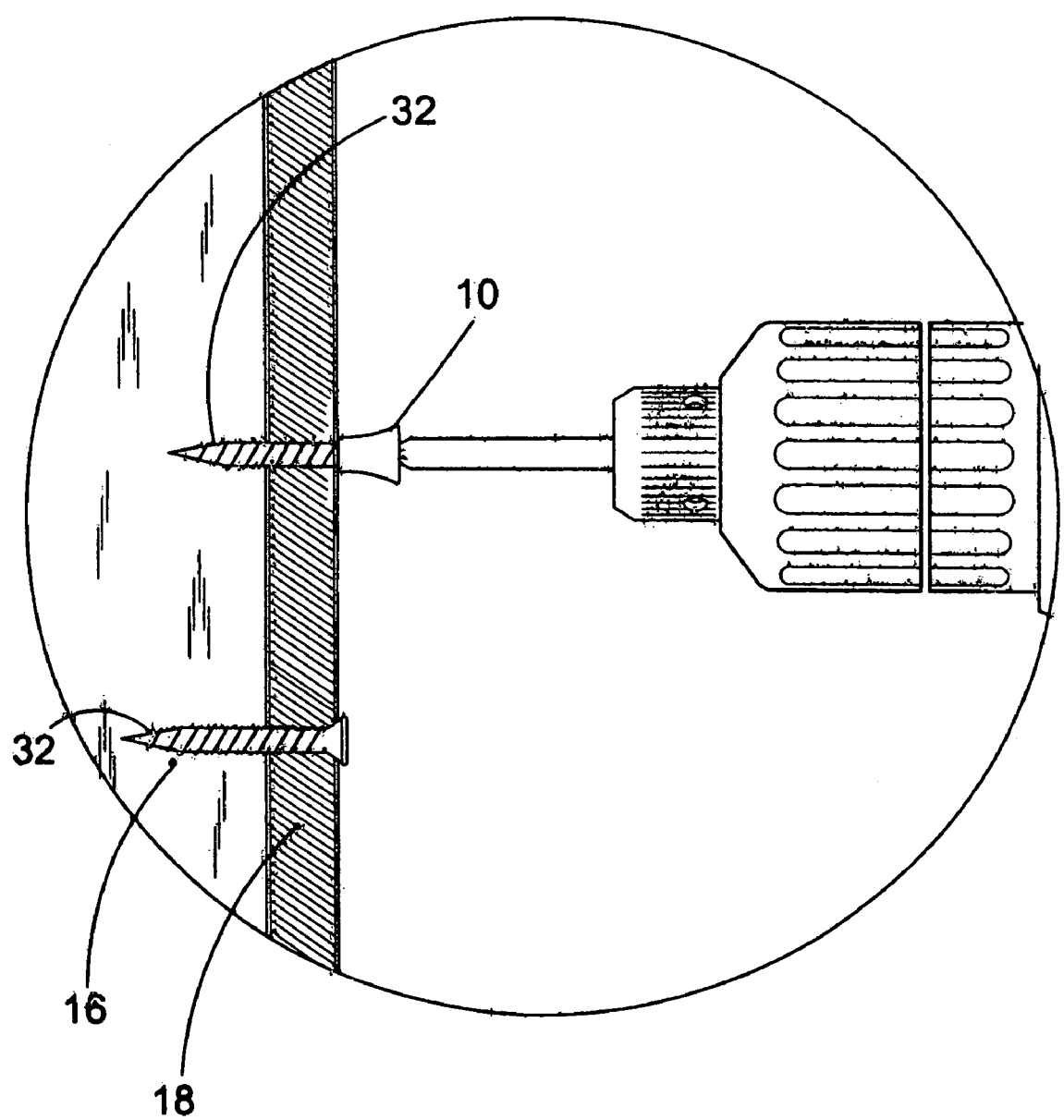
FIG. 20 is an illustrative side view of the prior art and the present invention in use with screws that have missed the stud.

Turning to FIG. 20, shown therein is an illustrative side view of the prior art and the present invention 10 in use with screws 32 that have missed the stud. The present invention 10 saves installers time when they miss the stud 16 because they don't have to try to back up the screw 32 or pull it out with their fingernails because the screw in the sheetrock 18 does not have enough drawing power to pull the preset depth spacer into the sheetrock 26 the user just grasps the present invention and pulls out the screw.

Figure 21:
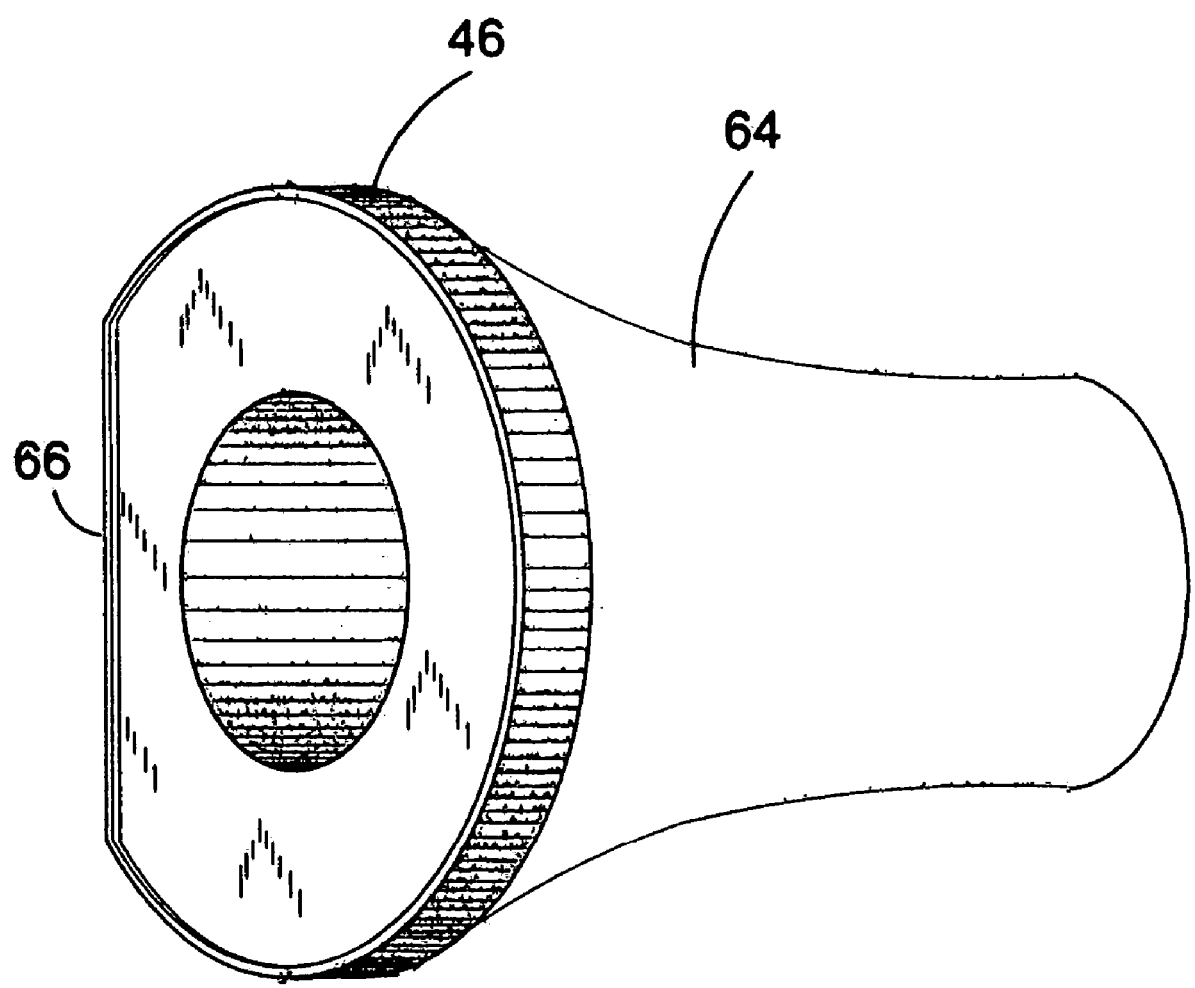
FIG. 21 is a perspective view of the large preset depth spacer for stick nails.

Turning to FIG. 21, shown therein is a perspective view of the large preset depth spacer for stick nails 64. The present invention 64 may also be designed tangentially flat 66 on one side of the head 46 to provide dense spacing when used with stick nail for use in a gun.

Figure 22:
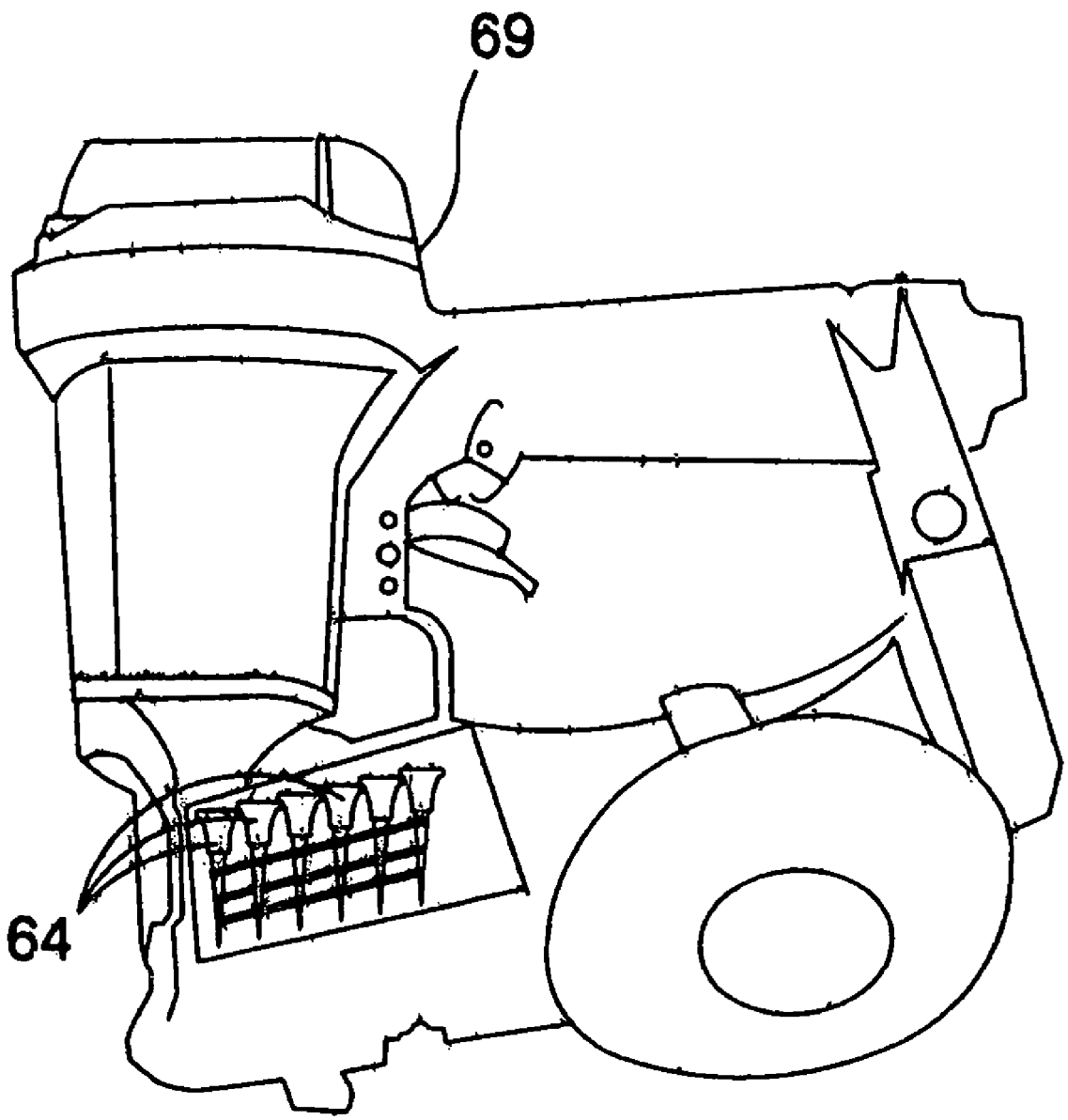
FIG. 22 is an illustrative view of the present invention installed in and ready for use with an air gun.

Turning to FIG. 22, shown therein is an illustrative view of the large preset depth spacer for stick nails 64 installed in and ready for use with an air gun 69.

FIG. 23 shows a further aspect of the present invention. As shown in FIG. 23, a nail 20 is inserted into a grooved spacer 100, having a plurality of grooves 102. The groove of the spacer 100 has certain advantages over other blunt or smooth spaces including improved gripping power and tensile strength when inserted into sheetrock. Further the groove of the spacer 100 forms a keyed opening into which pieces of the gypsum of the sheet rock become inserted preventing rotation of the spacer 100, and again improving the strength of the bond formed by inserting the nail 23 and spacer 100 into the sheetrock.

FIG. 24 shows an end view of the grooved spacer 100. Though shown in this example with six grooves 102, other numbers of grooves 102 could also be incorporated without departing from the scope of the instant invention. Further, though shown as having symmetrical grooves 102, the grooves 102 could be asymmetrical, or groups of grooves could be of different sizes then others. FIG. 25 shows a top view of the grooved spacer 100 showing a internal ring 104 on which the head 106 of the nail 20 sits when driven into sheetrock.

Another aspect of the invention is that as described above, the preset may be formed of metal. One particular application for the use of metal presets is for use when applying sheathing materials such as plywood, particleboard, and exterior wall board to either steel or wooden studs. This may be particularly useful, for example, when preparing for a hurricane or other weather event. The use of the presets, promotes good adherence to the plywood to the studs and resists unintentional removal. The preset itself is positioned on a nail or screw to fit snugly but still be able to rotate about the fastener. Preferably the preset is located about $1/8^{th}$ of an inch from the head of the nail or screw and thus the head of the nail would not be flush with the material being fastened following application. Such an orientation makes removal of board easier in applications where removal is considered. Further, such an orientation causes the weight of the board to be held by the preset.

I claim:

1. An apparatus and a sheet-shaped material, the apparatus for use with a fastener for attaching the material to a structural member, comprising:

a flared-shaped spacer having first and second ends and having a throughbore therein, wherein said throughbore is axially disposed to receive the fastener therein so that the fastener can rotate freely therein, a length from the first end to the second end of the spacer is smaller than a thickness of the material, the material including a face paper disposed on a front surface thereof, said first end having a countersunk annular flat surface to receive a head of the fastener thereon, an external surface of the spacer having an annular shape around the countersunk portion at said first end and being outwardly tapered from the second end till the annular shape at the first end, and when the fastener passes through the material into the structural member, the second end of the spacer is drawn into the material after the tip of the fastener passes through the material into the structural member until the entire spacer is embedded into the material and the second end of the spacer contacts the structural member so that the first end of the spacer forms a countersunk void on the front surface of the material, and when the fastener passes through the material into the structural member, a first portion of the face paper of the material is pulled and tucked into the countersunk void without shearing, and a second portion of the face paper is tucked between the spacer and the material.

2. An apparatus and a sheet shaped material as in claim 1, wherein said throughbore is cylindrical throughout its axial length.

3. An apparatus and a sheet shaped material as in claim 1, wherein said throughbore has a cylindrical lower portion and an outwardly flared upper portion.

* * * * *

UNITED STATES PATENT AND TRADEMARK OFFICE
CERTIFICATE OF CORRECTION

PATENT NO. : 7,866,931 B2  Page 1 of 1
APPLICATION NO. : 11/653030
DATED : January 11, 2011
INVENTOR(S) : James Murtha It is certified that error appears in the above-identified patent and that said Letters Patent is hereby corrected as shown below:

On the Title Page, item (63) should read as follows:

Related U.S. Application Data

-- (63) Continuation-in-part of application No. PCT/US2005/024805, filed on July 13, 2005 which is a continuation of 10/894,467, filed July 19, 2004, now abandoned --

Signed and Sealed this
Thirteenth Day of November, 2012

David J. Kappos
*Director of the United States Patent and Trademark Office*